(12) United States Patent
Yokoyama et al.

(10) Patent No.: US 9,340,115 B2
(45) Date of Patent: May 17, 2016

(54) SHOVEL

(71) Applicant: SUMITOMO HEAVY INDUSTRIES, LTD., Tokyo (JP)

(72) Inventors: Kazuya Yokoyama, Yokosuka (JP); Terunobu Nakajyo, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 6 days.

(21) Appl. No.: 14/445,262

(22) Filed: Jul. 29, 2014

(65) Prior Publication Data

US 2014/0333239 A1    Nov. 13, 2014

Related U.S. Application Data

(63) Continuation of application No. PCT/JP2013/052690, filed on Feb. 6, 2013.

(30) Foreign Application Priority Data

Feb. 14, 2012 (JP) .................... 2012-029366
Sep. 28, 2012 (JP) .................... 2012-216019

(51) Int. Cl.
*H02P 1/00* (2006.01)
*H02P 3/00* (2006.01)
*H02P 5/00* (2006.01)
(Continued)

(52) U.S. Cl.
CPC ............. *B60L 11/18* (2013.01); *H01M 2/1077* (2013.01); *H01M 2/20* (2013.01); *H01M 2/206* (2013.01); *H01M 6/46* (2013.01); *H01M 2220/20* (2013.01)

(58) Field of Classification Search
CPC ............................ B60L 11/18; H02M 2/1016
USPC ........................................................ 318/139
See application file for complete search history.

(56) References Cited

U.S. PATENT DOCUMENTS

2010/0190050 A1*  7/2010  Ochi ........................ 429/160
2012/0234613 A1    9/2012  Miyatake
(Continued)

FOREIGN PATENT DOCUMENTS

CN            102640347 A    8/2012
DE    11 2010 004 703 T5    11/2012
(Continued)

OTHER PUBLICATIONS

International Search Report dated Apr. 9, 2013 corresponding to International Patent Application No. PCT/JP2013/052690 and English translation thereof.
(Continued)

*Primary Examiner* — Erick Glass
(74) *Attorney, Agent, or Firm* — Squire Patton Boggs (US) LLP

(57) ABSTRACT

A shovel includes a power storage module; and an electric motor driven by electric power stored in the power storage module. The power storage module includes a plurality of cell units stacked to form a stacked structure. Each of the cell units has a power storage cell including a pair of electrode tabs; and a frame body configured to support the power storage cell. Each of the frame bodies has a screw-locking portion formed on a surface facing laterally and outwardly from the stacked structure. The plurality of power storage cells are electrically connected by screw-locking the electrode tabs of the power storage cells to the screw-locking portions.

15 Claims, 21 Drawing Sheets

(51) Int. Cl.
*B60L 11/18* (2006.01)
*H01M 2/20* (2006.01)
*H01M 2/10* (2006.01)
*H01M 6/46* (2006.01)

(56) References Cited

U.S. PATENT DOCUMENTS

2013/0101916 A1* 4/2013 Sugiura et al. ............... 429/480
2013/0130140 A1* 5/2013 Kato et al. ................... 429/429

FOREIGN PATENT DOCUMENTS

| | | |
|---|---|---|
| JP | 2010-161044 A | 7/2010 |
| JP | 5102902 B2 | 12/2012 |
| JP | 2013-038439 A | 2/2013 |
| JP | 5398273 B2 | 1/2014 |
| KR | 10-2012-0088807 A | 8/2012 |
| WO | WO 2011/070758 A1 | 6/2011 |

OTHER PUBLICATIONS

Notice of Reasons of Rejection dated Oct. 6, 2015 corresponding to Japanese Patent Application No. 2014-558651 and English translation thereof.

English translation of Relevant Parts of JP2010-161044 the reference of which was previously submitted in an Information Disclosure Statement on Jul. 29, 2014.

\* cited by examiner

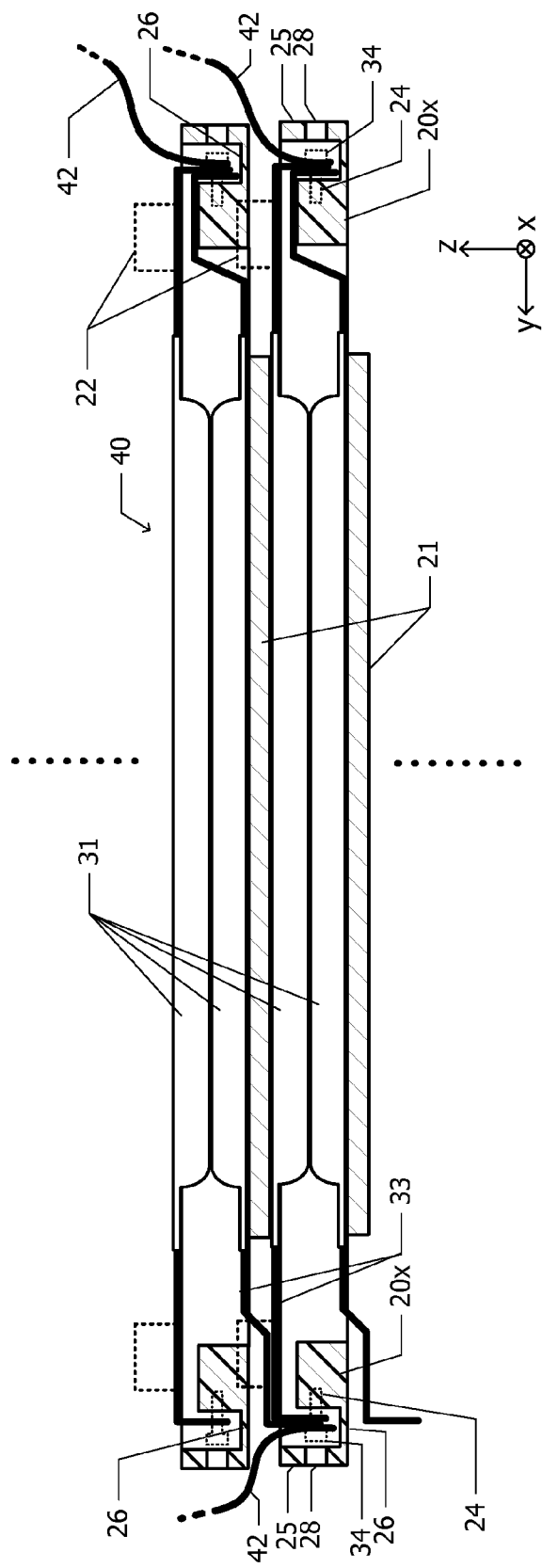

SHOVEL

RELATED APPLICATION

Priority is claimed to Japanese Patent Application No. 2012-029366, filed Feb. 14, 2012, Japanese Patent Application No. 2012-216019, filed Sep. 28, 2012, and International Patent Application No. PCT/JP2013/052690, the entire content of each of which is incorporated herein by reference.

BACKGROUND

1. Technical Field

The present invention relates to a shovel mounted with a power storage module including a plurality of power storage cells.

2. Description of Related Art

Power storage modules are well-known in which a plurality of laminated power storage cells are stacked and are connected in series. In the laminated power storage cells, a positive electrode plate and a negative electrode plate that are alternately stacked via a separator are sandwiched and sealed with two laminate films. A pair of electrode tabs are led out to the outside passing between the two laminate films. The plurality of power storage cells are mechanically supported by applying a compressive force in a stacking direction after the power storage cells are stacked.

SUMMARY

According to an embodiment of the present invention, there is provided a shovel including a power storage module; and an electric motor driven by electric power stored in the power storage module. The power storage module includes a plurality of cell units stacked, each of the cell units has a power storage cell including a pair of electrode tabs; and a frame body configured to support the power storage cell, each of the frame bodies has a screw-locking portion formed on a surface facing laterally and outwardly from the stacked structure, and the plurality of power storage cells are electrically connected by screw-locking the electrode tabs of the power storage cells to the screw-locking portions.

BRIEF DESCRIPTION OF THE DRAWINGS

FIG. 7 is a cross-sectional view of a stacked structure in which cell units used for the power storage module according to the embodiment shown in FIGS. 1A to 1C are stacked.

DETAILED DESCRIPTION

Figure 1A:
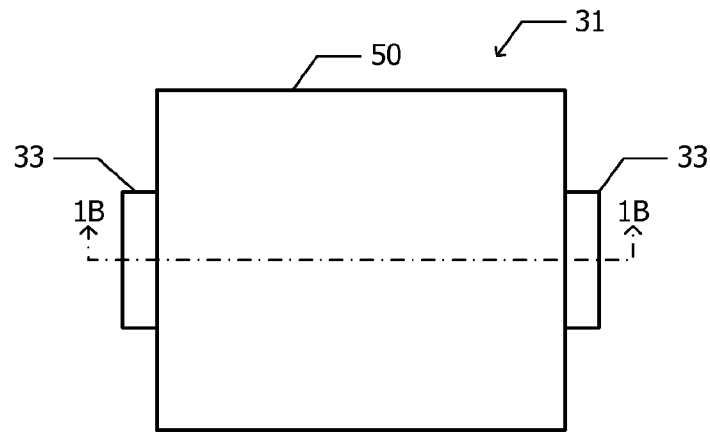
FIG. 1A is a plan view of a power storage cell used for a power storage module according to an embodiment.

In the laminated power storage cells, the laminate films are flexible. Therefore, it is difficult to position the power storage cells within a plane orthogonal to the stacking direction when being stacked. Additionally, since the power storage cells themselves spatially interfere with a welder in a stacked state, it is difficult to connect the electrode tabs of the power storage cells adjacent to each other through ultrasonic welding after being stacked. For this reason, it is preferable to perform the ultrasonic welding of the electrode tabs before being stacked. However, it is complicated to fold and stack the plurality of power storage cells, which are ultrasonically welded and lined up, while aligning the power storage cells, and an increase in assembly man-hours is brought about.

If an abnormality occurs in one power storage cell, the operation of the power storage module becomes unstable. In order to ensure the operational stability of the power storage module, a circuit configuration in which a voltage applied to each of the power storage cells is monitored may be adopted. In order to monitor the voltage applied to each of the power storage cells, voltage-monitoring wiring lines are respectively led out from a plurality of connection points of the plurality of power storage cells that are connected in series. When the number of connection points of the power storage cells increases, the number of the voltage-monitoring wiring lines also increases, and the wiring lines are apt to be scattered.

It is desirable to provide a shovel mounted with a power storage module that can reduce man-hours required for stacking a plurality of power storage cells to assemble the power storage module.

According to an embodiment of the present invention, there is provided a shovel including a power storage module; and an electric motor driven by electric power stored in the power storage module. The power storage module includes a plurality of cell units stacked, each of the cell units has a power storage cell including a pair of electrode tabs; and a frame body configured to support the power storage cell, each of the frame bodies has a screw-locking portion formed on a surface facing laterally and outwardly from the stacked structure, and the plurality of power storage cells are electrically connected by screw-locking the electrode tabs of the power storage cells to the screw-locking portions.

According to another embodiment of the present invention, the power storage module further includes a voltage-monitoring wiring line led out from each of the cell units, and the cell unit further includes a position constraint structure configured to constrain the position of the voltage-monitoring wiring line with respect to the frame body, and wherein the plurality of power storage cells are connected in series as a whole, the voltage-monitoring wiring lines are connected to the electrode tabs of the power storage cells.

Since the frame body supports the power storage cells, the power storage cells can be easily positioned when the power storage cells are stacked. Additionally, since a positioning portion has the structure in which the frame bodies can be displaced and approach each other in the stacking direction, a sufficient compressive force for the power storage cells can be applied. Since the position constraint structures constrain the positions of the voltage-monitoring wiring lines, scattering of the wiring lines can be prevented.

FIG. 1A illustrates a plan view of a laminated power storage cell 31 used for a power storage module according to an embodiment. For example, an electric double layer capacitor, a lithium ion secondary battery, a lithium ion capacitor, or the like is used for the power storage cell 31. A pair of electrode tabs 33 (electrode terminals) are led out in opposite directions from two edges (right and left edges in FIG. 1A) of a power storage container 50 having a substantially oblong planar shape, the two edges being parallel to each other.

Figure 1B:
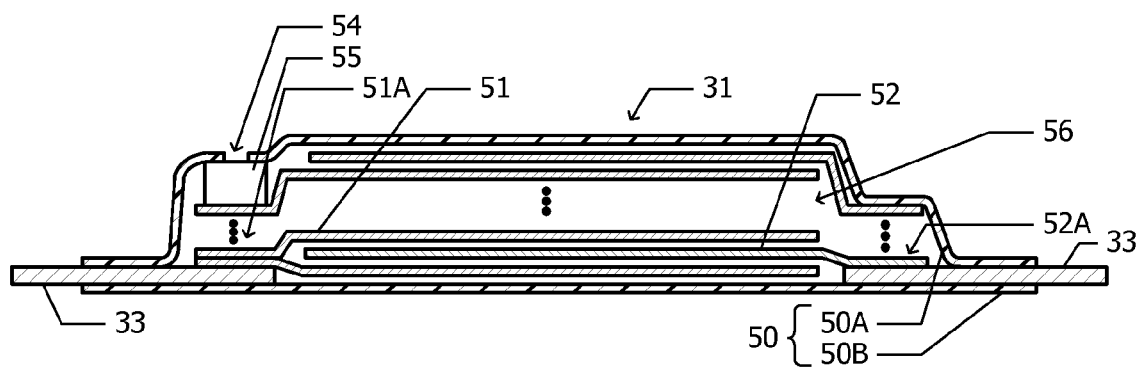
FIG. 1B is a cross-sectional view taken along one-dot chain line 1B-1B of FIG. 1A.

FIG. 1B illustrates a cross-sectional view taken along one-dot chain line 1B-1B of FIG. 1A. The power storage container 50 is constituted by two aluminum laminate films 50A and 50B. The aluminum laminate films 50A and 50B sandwich a power storage laminated body 56, and seal the power storage laminated body 56. One aluminum laminate film 50B is substantially flat, and the other aluminum laminate film 50A is deformed so as to reflect the shape of the power storage laminated body 56. The substantially flat surface is referred to as "back surface" and the surface that is deformed is referred to as "ventral surface". The electrode tabs 33 are respectively connected to a positive electrode current collector and a negative electrode current collector of the power storage laminated body 56. The electrode tabs 33 pass between the aluminum laminate film 50A and the aluminum laminate film 50B, and are led out to the outside of the power storage container 50. For example, aluminum plates are used for the electrode tabs 33.

Figure 1C:
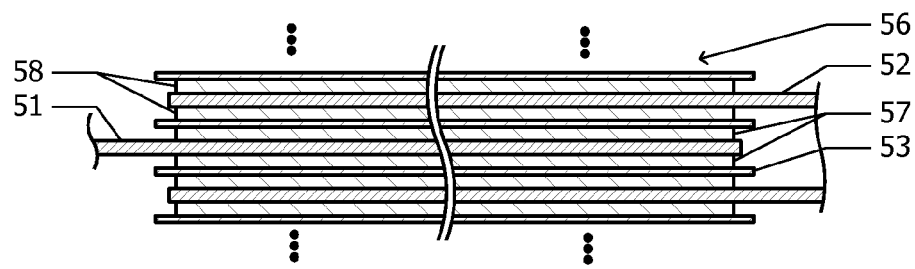
FIG. 1C is a partial cross-sectional view of a power storage laminated body.

FIG. 1C illustrates a partial cross-sectional view of the power storage laminated body 56. Polarizable electrodes 57 for a positive electrode are arranged on both sides of a positive electrode current collector 51, and polarizable electrodes 58 for a negative electrode are arranged on both sides of a negative electrode current collector 52. For example, aluminum foil is used for each of the positive electrode current collector 51 and the negative electrode current collector 52. Hereinafter, an example of a method for forming the polarizable electrodes 57 for a positive electrode will be described. First, activated carbon particles and a binder are mixed to obtain a slurry. After this slurry is coated on the surfaces of the positive electrode current collector 51, the slurry is heated. As the activated carbon particles are fixed to the surfaces of the positive electrode current collector 51 by heating, the polarizable electrodes 57 are formed. The polarizable electrodes 58 for a negative electrode are also formed by the same method.

The positive electrode current collector 51 and the polarizable electrodes 57 formed on both sides thereof are referred to as a "positive electrode plate", and the negative electrode current collector 52 and the polarizable electrodes 58 formed on both sides thereof are referred to as a "negative electrode plate". The positive electrode plate and the negative electrode plate are alternately laminated. A separator 53 is arranged between the positive electrode plate and the negative electrode plate. For example, cellulose paper is used for the separator 53. An electrolytic solution is impregnated in this cellulose paper. A polarizable organic solvent, for example, propylene carbonate, ethylene carbonate, ethyl methyl carbonate, or the like is used for a solvent of the electrolytic solution. Quaternary ammonium salt, for example, spirobipyrrolidinium tetrafluoroborate (SBPB4), is used as an electrolyte (supporting electrolyte). The separator 53 prevents short-circuiting between the polarizable electrodes 57 for a positive electrode and the polarizable electrodes 58 for a negative electrode, and short-circuiting between the positive electrode current collector 51 and the negative electrode current collector 52.

Description will be continued returning back to FIG. 1B. In FIG. 1B, the description of the separator 53 and the polarizable electrodes 57 and 58 is omitted.

The positive electrode current collector 51 and the negative electrode current collector 52 have connecting portions 51A and 52A extending in directions opposite to each other (leftward and rightward in FIG. 1A) from overlapping regions of both, respectively. The connecting portions 51A of a plurality of the positive electrode current collectors 51 are overlapped with one another, and are ultrasonically welded to one electrode tab 33. The connecting portions 52A of a plurality of the negative electrode current collectors 52 are overlapped with one another, and are ultrasonically welded to the other electrode tab 33. For example, aluminum plates are used for the electrode tabs 33.

The electrode tabs 33 pass between the aluminum laminate film 50A and the aluminum laminate film 50B, and are led out to the outside of the power storage container 50. The electrode tabs 33 are heat-welded to the aluminum laminate film 50A and the aluminum laminate film 50B, at lead-out points.

A gas vent valve 55 is arranged between the connecting portion 51A of the positive electrode current collector 51, and the aluminum laminate film 50A. The gas vent valve 55 is arranged so as to block a gas vent hole 54, and is heat-welded to the aluminum laminate film 50A. The gas generated inside the power storage container 50 is vented to the outside through the gas vent valve 55 and the gas vent hole 54.

The inside of the power storage container 50 is evacuated. For this reason, the aluminum laminate films 50A and 50B are deformed by the atmospheric pressure so as to follow the outer shape of the power storage laminated body 56 and the gas vent valve 55.

Figure 2:
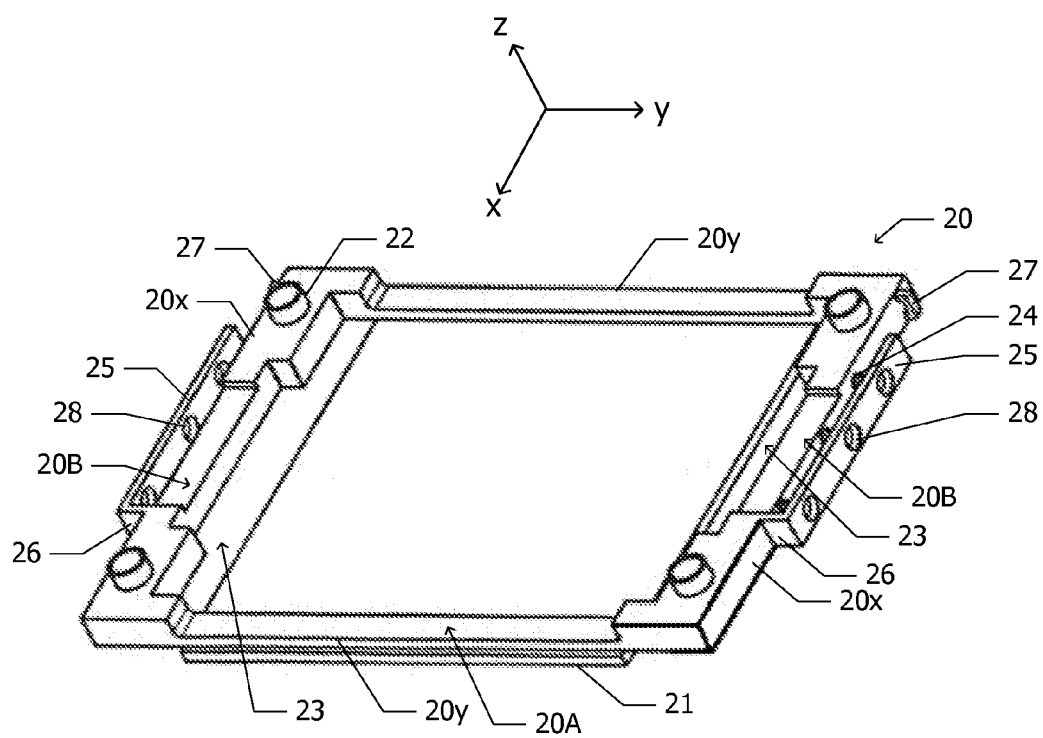
FIG. 2 is a perspective view of a frame body and a heat transfer plate used for the power storage module according to the embodiment shown in FIGS. 1A to 1C.
Figure 3A:
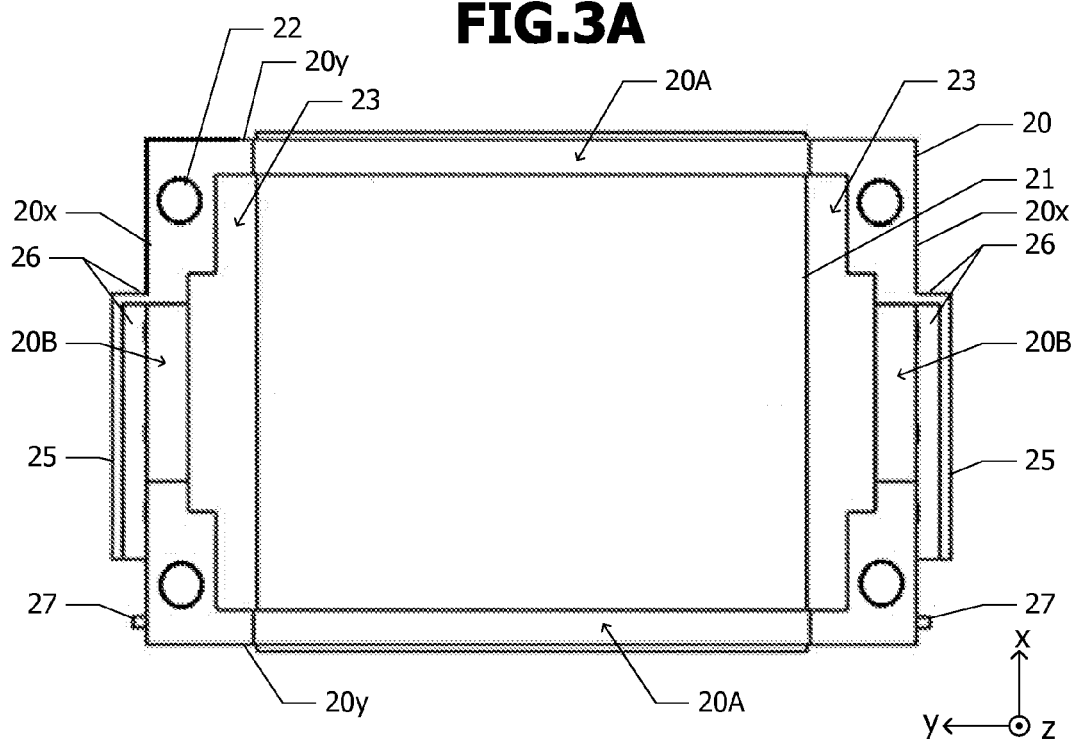
FIG. 3A is a plan view of the frame body and the heat transfer plate used for the power storage module according to the embodiment shown in FIGS. 1A to 1C.
Figure 3B:
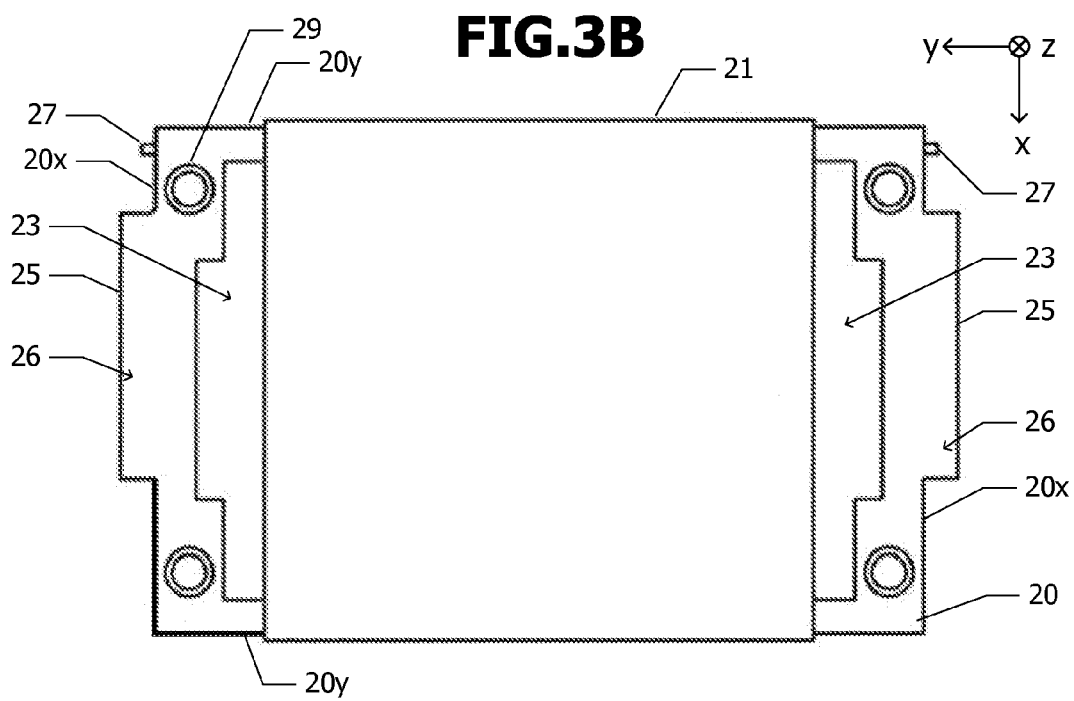
FIG. 3B is a bottom plan view of the frame body and the heat transfer plate used for the power storage module according to the embodiment shown in FIGS. 1A to 1C.

FIG. 2 illustrates a perspective view of a frame body 20 and a heat transfer plate 21 used for the power storage module according to the embodiment. FIG. 3A illustrates a plan view of the frame body 20 and the heat transfer plate 21, and FIG. 3B illustrates a bottom plan view of the frame body 20 and the heat transfer plate 21. Hereinafter, the structure of the frame body 20 and the heat transfer plate 21 will be described, referring to FIGS. 2, 3A, and 3B.

The laminated power storage cells 31 (FIGS. 1A to 1C) are housed inside the frame body 20 having a shape along an oblong outer peripheral line. Hereinafter, an xyz rectangular coordinate system is defined in order to facilitate understanding. The surface of the frame body 20 that faces a positive direction of a z axis is defined as a top surface, and the surface of the frame body 20 that faces a negative direction is defined as a bottom surface. The frame body 20 includes a portion (x-direction portions) 20x along sides parallel to an x direction of the oblong shape, and portions (y-direction portions) 20y along sides parallel to a y direction. The heat transfer plate 21 is attached to the bottom surface of the frame body 20. The heat transfer plate 21 has an oblong planar shape, and is arranged so as to block most of a region surrounded by the frame body 20.

Insulating resin, for example, ABS resin, polybutylene terephthalate (PBT), or the like is used for the frame body 20. Metal with high thermal conductivity, for example, aluminum, is used for the heat transfer plate 21.

The top surface of the frame body 20 is formed with four protrusions 22 (FIG. 2, FIG. 3A) protruding in a positive direction of the z axis. The four protrusions 22 are respectively arranged slightly inside than four corners of the frame body 20. Each of the protrusions 22 has a hollow cylindrical shape. The bottom surface of the frame body 20 is formed with four recesses 29. The recesses 29 are arranged in regions corresponding to the protrusions 22. When a plurality of the frame bodies 20 are stacked with one another in a z direction, the protrusions 22 of the frame body 20 on a negative side in the z direction are inserted into the recesses 29 of the frame body 20 on a positive side in the z direction. Accordingly, the relative positions of the plurality of frame bodies 20 with respect to in-plain direction parallel to an xy plane are constrained.

The heat transfer plate 21 is laid between the y-direction portions 20y of the frame body 20, and stays away from the x-direction portions 20x. For this reason, opening portions 23 are formed between the x-direction portions 20x of the frame body 20 and the heat transfer plate 21, respectively. The heat transfer plate 21 protrudes further outward than outside edges of the y-direction portions 20y of the frame body 20.

Regions 20A (FIG. 3A) of the top surface of the y-direction portions 20y of the frame body 20 that overlap the heat transfer plate 21 are lower than the other regions. Level differences (height differences) between the low regions 20A and the other regions are greater than the thickness of the heat transfer plate 21. When the plurality of frame bodies 20 are stacked with one another in the z direction, the heat transfer plate 21 is settled in the low regions 20A. For this reason, when the frame bodies 20 are stacked in the z direction, the heat transfer plate 21 does not hinder the contact between the top surface of the frame body 20 on the negative side in the z direction, and the bottom surface of the frame body 20 on the positive side in the z direction.

A partial region 20B (FIGS. 2 and 3A) of each x-direction portion 20x of the frame body 20 is lower than the other regions. Each electrode tab 33 (FIG. 1A) is arranged on the low region 20B. That is, the electrode tab 33 overlaps the low region 20B in a plan view.

A plurality of tapped holes (screw-locking portions) 24, for example, three tapped holes, are formed in the outer peripheral surface of each x-direction portion 20x of the frame body 20. A protective plate 25 is arranged at a distance from and parallel to the surface on which the tapped holes 24 are formed. The protective plate 25 is supported by the frame body 20 via a supporting wall 26. The supporting wall 26 is arranged at a position where the communication between the surface on which the tapped holes 24 are formed, and the low region 20B is not hindered.

The protective plate 25 is formed with through-holes 28. The through-holes 28 are arranged at intersection points between imaginary columns obtained by extending the tapped holes 24 in the y direction, and the protective plate 25. A screwdriver can be inserted into the through-holes 28 and screws can be screwed into the tapped holes 24.

Portions 27 to be bound are formed on the outside surfaces of the pair of x-direction portions 20x, respectively. Each portion 27 to be bound has a portal frame shape, and demarcates an opening which is passed through in the x direction. The operation and effects of the portion 27 to be bound will be described below in another embodiment, referring to FIGS. 14 to 16.

The frame body 20, the protective plates 25, the supporting walls 26, and the portions 27 to be bound are integrally molded from resin. The heat transfer plate 21 is, for example, screw-locked to the frame body 20. Otherwise, the heat transfer plate 21 is anchored to the frame body 20 during the molding of the frame body 20.

Figure 4:
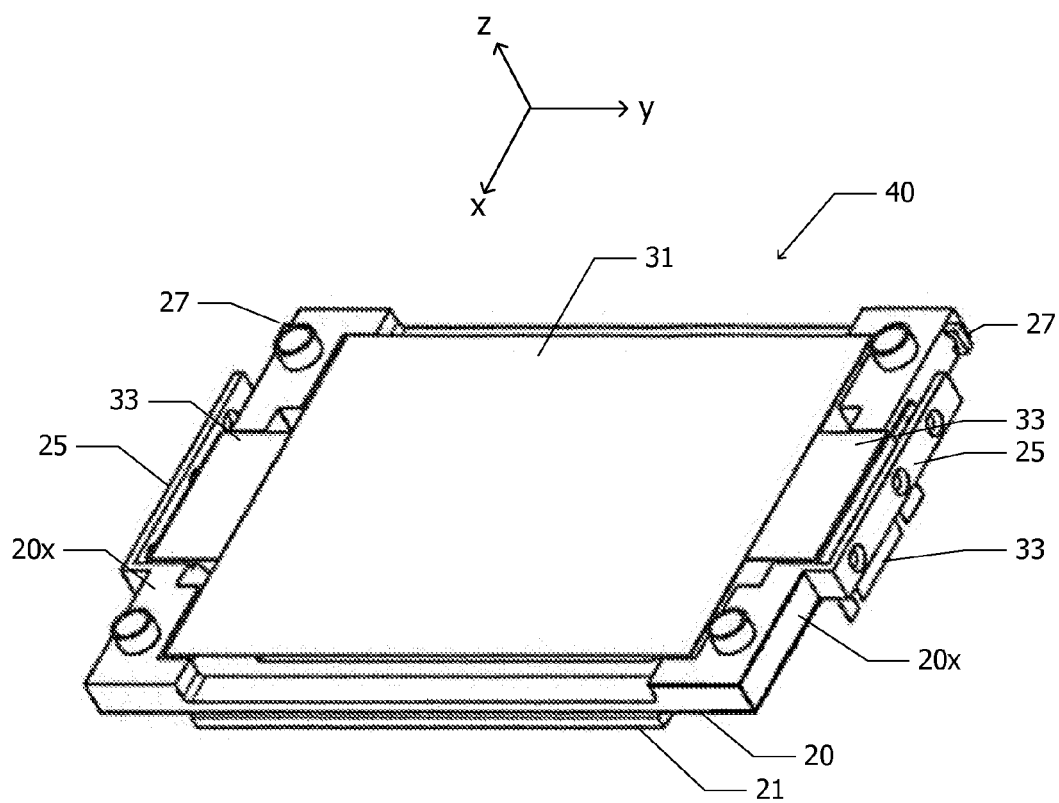
FIG. 4 is a perspective view of a cell unit used for the power storage module according to the embodiment shown in FIGS. 1A to 1C.
Figure 5A:
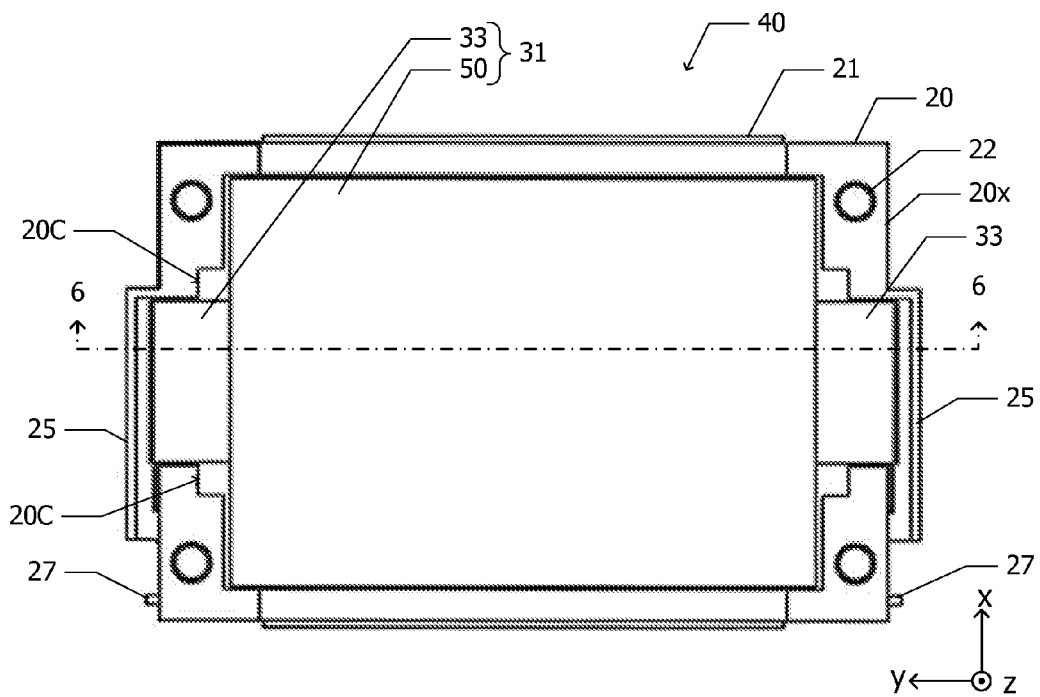
FIG. 5A is a plan view of the cell unit used for the power storage module according to the embodiment shown in FIGS. 1A to 1C.
Figure 5B:
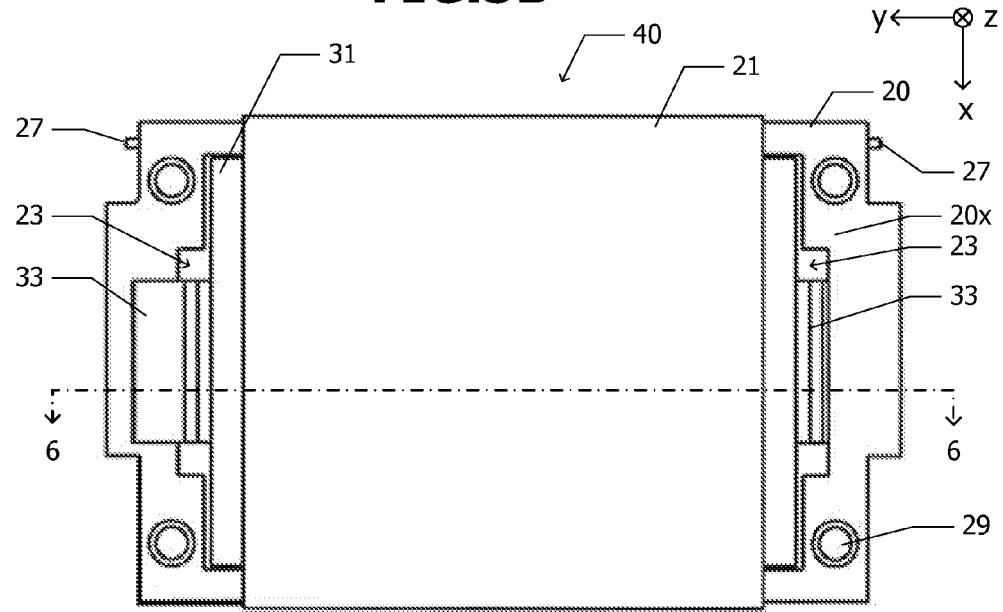
FIG. 5B is a bottom plan view of the cell unit used for the power storage module according to the embodiment shown in FIGS. 1A to 1C.
Figure 6:
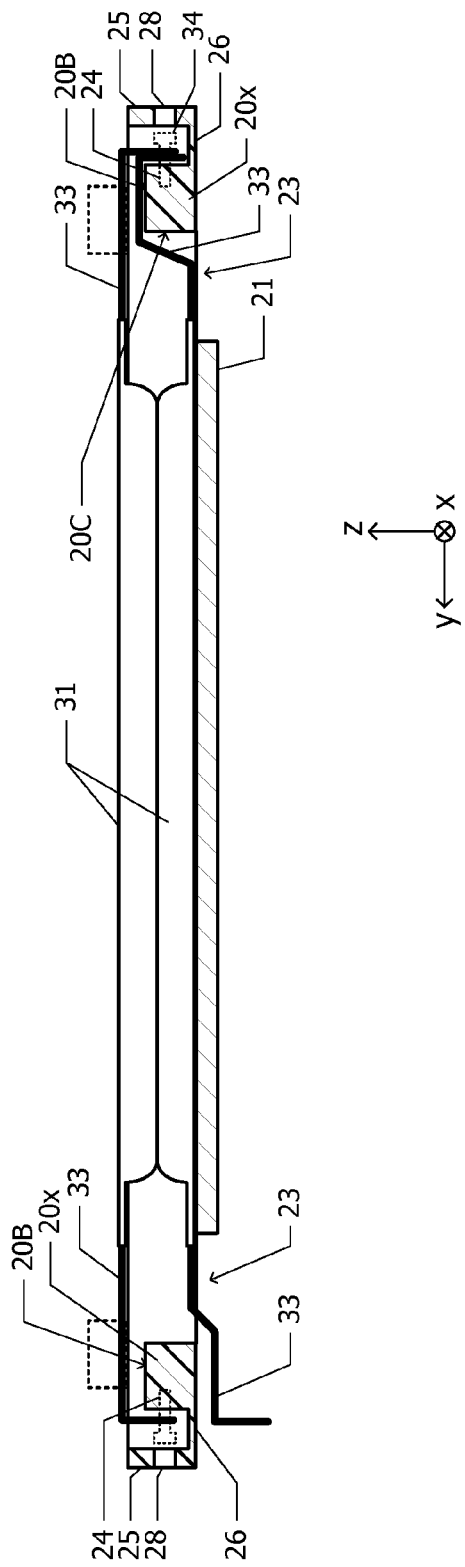
FIG. 6 is a cross-sectional view of the cell unit used for the power storage module according to the embodiment shown in FIGS. 1A to 1C.

FIG. 4 illustrates a perspective view of a cell unit 40 that constitutes the power storage module according to the above embodiment. FIGS. 5A and 5B illustrates a plan view and a bottom view of the cell unit 40, respectively. FIG. 6 illustrates a cross-sectional view taken along one-dot chain line 6-6 of FIGS. 5A and 5B. Hereinafter, the structure of the cell unit 40 will be described, referring to FIGS. 4, 5A, 5B, and 6.

The cell unit 40 includes a frame body 20, a heat transfer plate 21, and two power storage cells 31. As illustrated in FIG. 6, the two power storage cells 31 are stacked with each other such that ventral surfaces thereof are made to face each other, and are placed on a top surface side of the heat transfer plate 21. The two power storage cells 31 are supported inside the frame body 20. As illustrated in FIG. 5A, when viewed with a line of sight parallel to the z axis, the frame body 20 surrounds the power storage container 50 of each power storage cell 31.

As illustrated in FIGS. 5B and 6, one electrode tab 33 of the power storage cell 31 arranged on a bottom surface side (heat transfer plate 21 side) of the frame body 20 passes through the opening portion 23 on a positive side (left side in FIGS. 5B and 6) in a y direction, and is led out to a space on the bottom surface side of the frame body 20. The electrode tab 33 on a negative side (right side in FIGS. 5B and 6) in the y direction passes above the low region 20B (FIGS. 2, 3A, and 6) of the x-direction portion 20x of the frame body 20, and is inserted into a gap between the x-direction portion 20x and the protective plate 25.

As illustrated in FIGS. 4, 5A, and 6, the pair of electrode tabs 33 of the power storage cell 31 arranged on the top surface side of the frame body 20 pass above the low regions 20B of the x-direction portions 20x of the frame body 20, respectively, and are inserted into the gaps between the x-direction portions 20x and the protective plates 25, respectively. The electrode tabs 33 of the two power storage cells 31 on the negative side (right side in FIG. 6) in the y direction are overlapped with each other within the gap between the x-direction portion 20x and the protective plate 25. The top surface (back surface) of a power storage cell 31 on the top surface side protrudes further upward than the top surface of the frame body 20. That is, the thickness of the total of the two power storage cells 31 is greater than the thickness from the bottom surface of the frame body 20 to the top surface thereof.

As illustrated in FIG. 5A, regions 20C of the inside surface of the x-direction portion 20x intersecting the electrode tab 33 are located at an outer position than regions on both sides of the regions 20C. The regions on both sides of the regions intersecting the electrode tab 33 serve as a positioning reference of the power storage container 50 in the y direction. Since the regions 20C intersecting the electrode tab 33 are located at an outer position than the regions on both sides of the regions 20C, as illustrated in FIG. 6, it is possible to gently deform the electrode tab 33 of a power storage cell 31 arranged on the heat transfer plate 21 side.

FIG. 7 illustrates a cross-sectional view in a state where a plurality of the cell units 40 are stacked with one another. The protrusions 22 of the frame body 20 on the negative side in the z direction are inserted into the recesses 29 (FIG. 5B) of the frame body 20 on the positive side in the z direction. These constrain the positions of the plurality of cell units 40 in the xy plane. The protrusions 22 and the recesses 29 are referred to as "positioning portions".

The electrode tab 33, on the positive side in the y direction, of the power storage cell 31 arranged on a bottom surface side of the cell unit 40 on the positive side in the z direction out of the two cell units 40 adjacent to each other in the z direction is inserted into the gap between the protective plate 25 and the x-direction portion 20x of the cell unit 40 on the negative side in the z direction. Accordingly, the electrode tab 33, on the positive side in the y direction, of the cell unit 40 on the negative side in the z direction, and the electrode tab 33, on the positive side in the y direction, of the cell unit 40 on the positive side in the z direction are overlapped with each other within the gap between the protective plate 25 and the x-direction portion 20x on the positive side (left side in FIG. 7) in the y direction.

The electrode tabs 33, on the negative side in the y direction, of the two power storage cells 31 included in one cell unit 40 are overlapped with each other within the gap between the protective plate 25 and the x-direction portion 20x on the negative side (right side in FIG. 7) in the y direction. Each electrode tab 33 is formed with a hole for allowing a screw to pass therethrough. By screwing the screw 34 to the tapped hole 24 through the hole formed in the electrode tab 33, the two electrode tabs 33 can be electrically connected to each other and can be fixed to the frame body 20. This allows the plurality of power storage cells 31 to be connected in series. Since the protective plate 25 is formed with the through-holes 28, the screw 34 can be tightened from the outside even in a state where the cell units 40 are stacked.

The supporting wall 26 that supports the protective plate 25 on the negative side in the y direction on the frame body 20 prevents the electrode tab 33 inserted into the gap between the protective plate 25 and the x-direction portion 20x on the negative side in the y direction from protruding from the bottom surface of the frame body 20 in the negative direction of the z direction. For this reason, the supporting wall 26 that supports the protective plate 25 on the negative side in the y direction on the frame body 20 has also the function of preventing the electrode tab 33 on the negative side in the y direction from coming into contact with the electrode tab 33, on the negative side in the y direction, of the cell unit 40 on the negative side in the z direction. The supporting wall 26 that supports the protective plate 25 on the positive side in the y direction has the function of preventing the electrode tabs 33, on the positive side in the y direction, of the two power storage cells 31 within the same cell unit 40 from coming into contact with each other.

The power storage cell 31 arranged on the bottom surface side of the frame body 20 is brought into contact with and thermally coupled with the heat transfer plate 21 of the cell unit 40 that houses the power storage cell 31. The power storage cell 31 arranged on the top surface side of the frame body 20 is brought into contact with and is thermally coupled with the heat transfer plate 21 of the cell unit 40 adjacent to, on the positive side in the z direction, the cell unit 40 that houses the focusing power storage cell 31.

One end of a voltage-monitoring wiring line 42 is electrically connected to the electrode tab 33 by the screw 34. The voltage-monitoring wiring lines 42 are connected to the x-direction portion 20x of the cell unit 40 on the positive side of the y axis and the x-direction portion 20x on the negative side of the y axis, respectively. For this reason, two voltage-monitoring wiring lines 42 are led out from one cell unit 40.

Figure 8A:
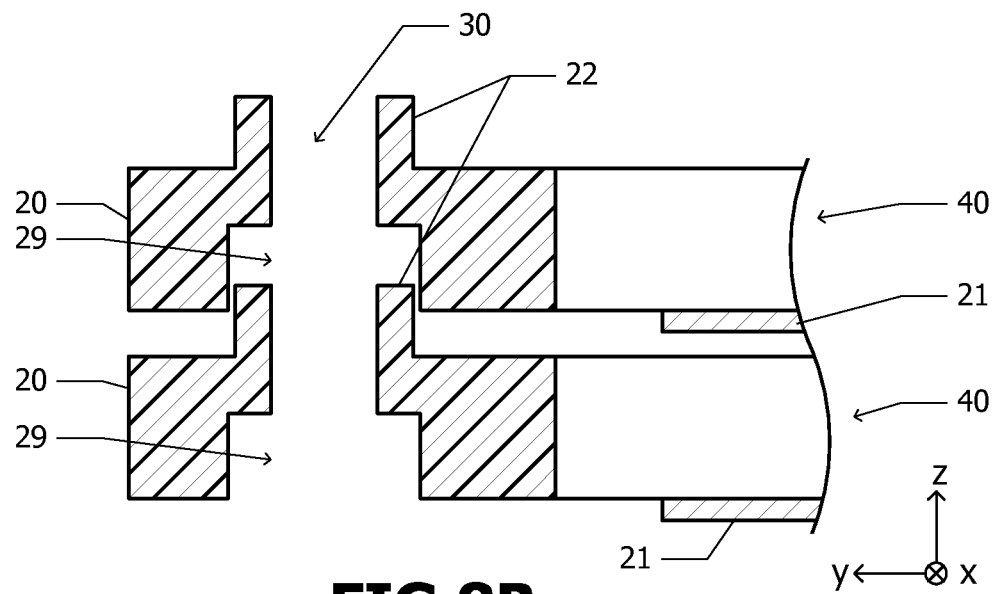
FIG. 8A is a cross-sectional view of a positioning portion of the power storage module according to the embodiment shown in FIGS. 1A to 1C.

FIG. 8A illustrates a cross-sectional view of a positioning portion. The protrusion 22 is formed on the top surface of each frame body 20, and the recess 29 is formed on the bottom surface of the frame body. The through-hole 30 that leads from a bottom surface of the recess 29 to a top surface of the protrusion 22 is formed. For this reason, the protrusion 22 has a hollow cylindrical shape.

The protrusion 22 formed on the cell unit 40 on the negative side in the z direction between the two cell units 40 adjacent to each other in the z direction is inserted into the recess 29 formed in the cell unit 40 on the positive side in the z direction. As described with reference to FIG. 6, since the total thickness of the two power storage cells 31 is greater than the thickness from the bottom surface of the frame body 20 to the top surface thereof, the top surface of the frame body 20 on the negative side in the z direction and the bottom surface of the frame body 20 on the positive side in the z direction do not come into contact with each other. A gap is also formed between the tip of the protrusion 22 and the bottom surface of the recess 29 where the protrusion 22 is inserted. For this reason, although a positioning portion constituted by the protrusion 22 and the recess 29 constrains the relative positions of the stacked cell units 40 in directions parallel to the xy plane, the positioning portion allows displacement of the stacked cell units 40 in directions in which the stacked cell units 40 further approach each other in the z direction.

Figure 8B:
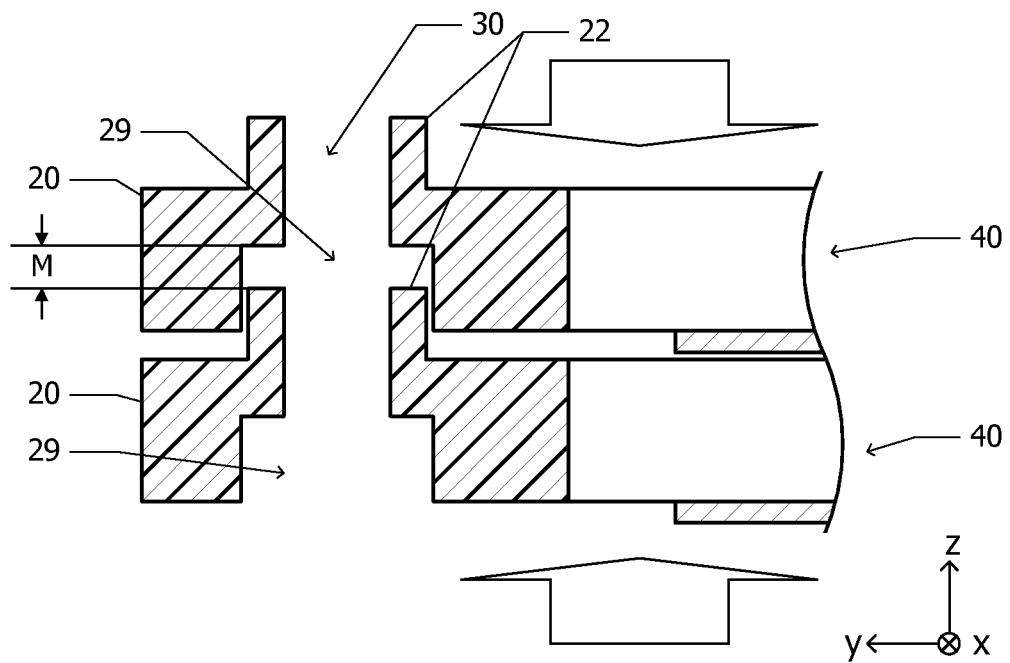
FIG. 8B is a cross-sectional view of the positioning portion in a state where a compressive force is applied.

FIG. 8B illustrates a cross-sectional view of the positioning portion when a compressive force is applied in the z direction. Since the positioning portion (the protrusion 22 and the recess 29) allows the displacement of the stacked cell units 40 in directions in which the stacked cell units 40 approach each other in the z direction, when a compressive force is applied, each of the power storage cells 31 (FIG. 6) is deformed so as to be thin, and the frame bodies 20 are displaced in mutually approaching directions. Even after the compressive force is applied, the top and bottom surfaces of the two frame bodies 20 adjacent to each other in the z direction do not come into contact with each other, and a margin M in directions in which the frame bodies 20 further approach each other in the z direction remains.

Since there is a variation in the thickness of the power storage cells 31, if the margin M is not left, the frame bodies 20 may come into contact with each other at apart thereof in a state where a compressive force is applied. If the frame bodies 20 come into contact with each other, the compressive force applied by pressurizing plates 43 are distributed to the power storage cells 31 and the frame bodies 20. For this reason, the compressive force applied to the power storage cells 31 becomes weak.

In the above embodiment, since the margin M remains, even if there is a variation in the thickness of the power storage cells 31, the compressive force can be preferentially applied to each of the power storage cells 31. For this reason, the compressive force is equally distributed to all the power storage cells 31. The compressive force suppresses degradation of the electrical property of the power storage cells 31, and firmly fixes the positions of the power storage cells 31.

Figure 9A:
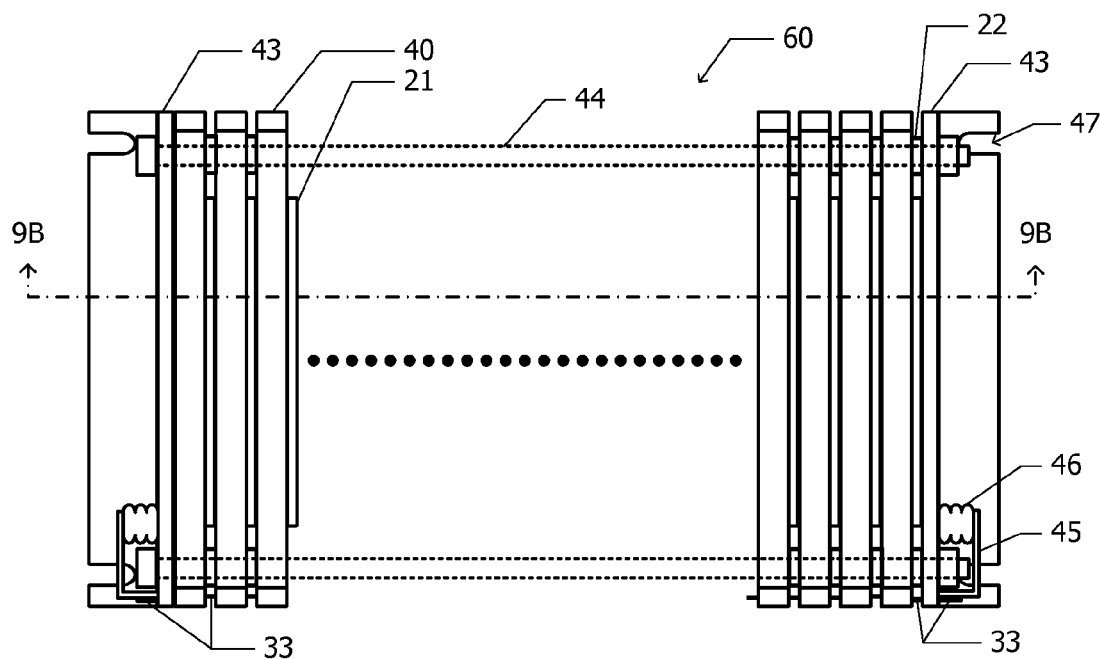
FIG. 9A is a plan view of the power storage module according to the embodiment shown in FIGS. 1A to 1C.

FIG. 9A illustrates a plan view of the power storage module 60 according to the embodiment. The plurality of cell units 40 are stacked. A compressive force in a stacking direction is applied to a stacked structure of the cell units 40 by a pressurizing mechanism. The pressurizing mechanism includes the pressurizing plates 43 arranged at both ends of the stacked structure, and a plurality of, for example, four tie rods 44. Each tie rod 44 passes through one pressurizing plate 43 and reaches the other pressurizing plate 43. By tightening a bolt to the tip of the tie rod 44, forces in directions in which the two pressurizing plates 43 are brought close to each other are applied to the pressurizing plates 43. Accordingly, a compressive force in a stacking direction is applied to the stacked structure of the cell units 40. The tie rod 44 passes through the recess 29 and the through-hole 30 (FIG. 8A) formed in the frame body 20. When the tip of the protrusion 22 of the frame body 20 arranged at a right end of FIG. 9A comes into contact with the pressurizing plate 43, a spacer may be inserted between the heat transfer plate 21 at the right end and the pressurizing plate 43. This spacer prevents a situation in which the tip of the protrusion 22 of the frame body 20 arranged at the right end comes into contact with the pressurizing plate 43.

The relay bus bar 45 is attached to an outside surface of the pressurizing plate 43 via an insulator 46. One electrode tab 33 of each of the cell units 40 at both ends is electrically connected to the relay bus bar 45. The relay bus bar 45 serves as a terminal for performing charging and discharging of a series connection circuit of the power storage cells 31.

The vicinity of one edge (an edge on a back surface side of a sheet in FIG. 9A) of the pressurizing plate 43 is bent in an L-shape. A U-shaped notch 47 for screw locking is formed in a portion closer to a tip than the bending point.

Figure 9B:
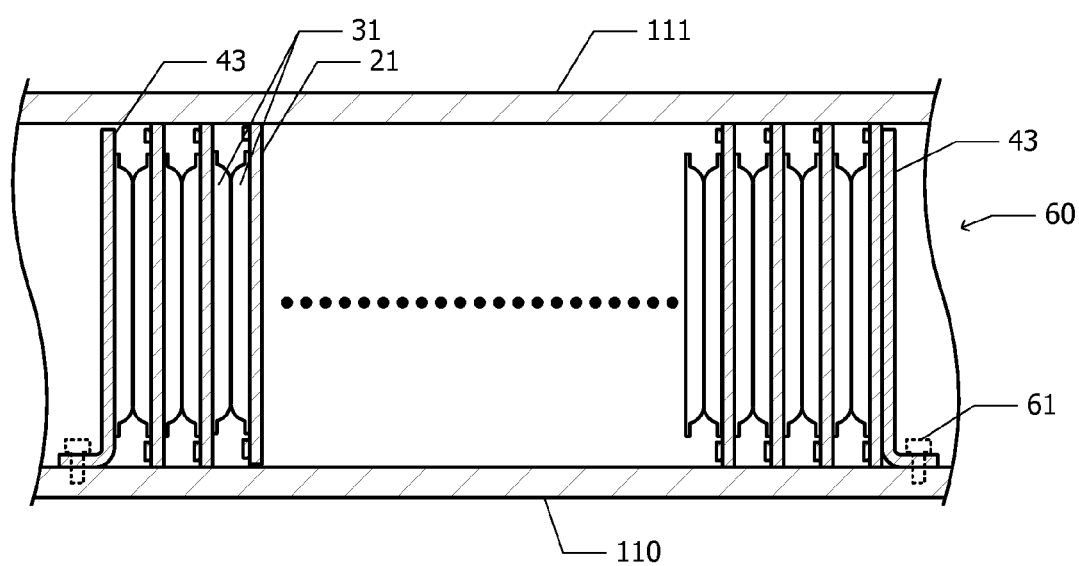
FIG. 9B is a cross-sectional view taken along one-dot chain line 9B-9B of FIG. 9A.

FIG. 9B illustrates a cross-sectional view taken along one-dot chain line 9B-9B of FIG. 9A. The power storage module 60 according to the embodiment shown in FIGS. 1A to 9A is fixed to the bottom surface of the lower housing 110 with screws 61. The end surfaces of the heat transfer plates 21 come into contact with the bottom panel of the lower housing 110. An upper housing 111 is arranged on the power storage module 60. Top end surfaces of the heat transfer plates 21 come into contact with the upper housing 111. The heat transfer plates 21 transmit the heat generated in the power storage cells 31 to the lower housing 110 and the upper housing 111.

Figure 10A:
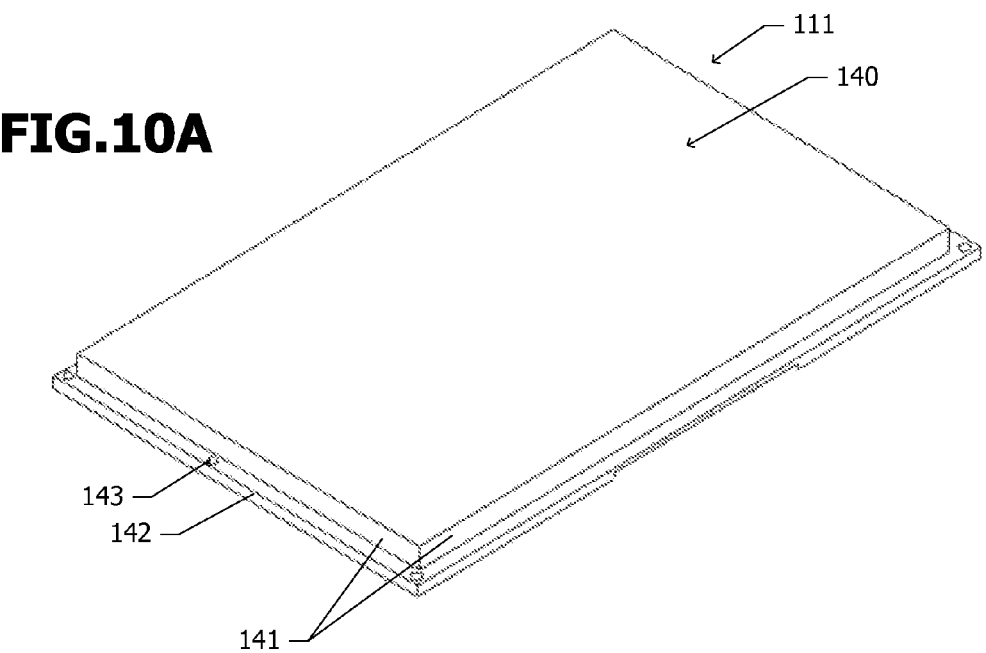
FIG. 10A is a perspective view of an upper housing.
Figure 10B:
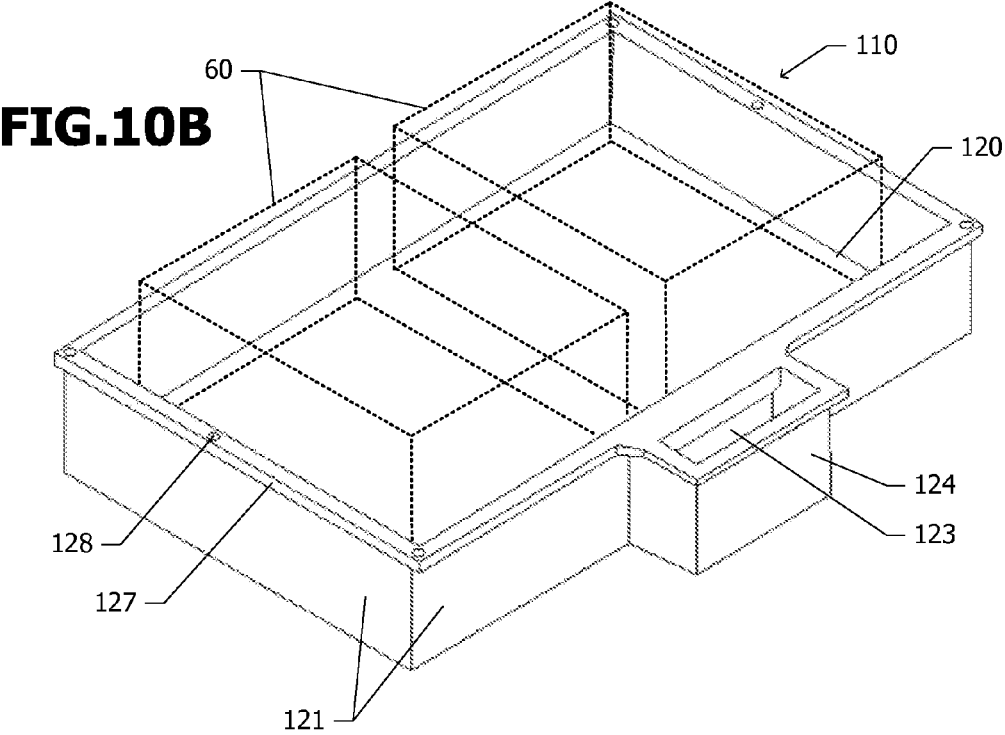
FIG. 10B is a perspective view of a lower housing.

FIGS. 10A and 10B illustrate perspective views of the upper housing 111 and the lower housing 110 in which the power storage module according to the above embodiment shown in FIG. 1A to 9B is housed, respectively.

As illustrated in FIG. 10B, the lower housing 110 includes an oblong bottom panel 120, and four side panels 121 extending upward from the edges of the bottom panel 120. The lower housing 110 is open upward. An open portion of the lower housing 110 is closed by the upper housing 111 (FIG. 10A). Upper ends of the side panels 121 are provided with a flange 127. The flange 127 is formed with a plurality of through-holes 128 for allowing bolts to pass therethrough. Each of the lower housing 110 and the upper housing 111 is formed by, for example, a casting process.

Two power storage modules 60 (FIGS. 9A and 9B) are mounted on the bottom panel 120. The power storage modules 60 are screw-locked to the bottom panel 120 at the positions of the notches 47 (FIG. 9A). The two power storage modules 60 are arranged in a posture in which stacking directions thereof become parallel to each other. The opening 123 is formed in one side panel 121 intersecting the stacking direction of each power storage module 60.

A connector box 124 is arranged outside the side panel 121 formed with the opening 123 so as to close the opening 123. The connector box 124 is open upward. This open portion is closed by a connector. The power storage modules 60 are connected to an external electric circuit via the connector. As an example, a voltage monitoring part, a charging and discharging control device, and the like are included in the external electric circuit. The two power storage modules 60 are connected to each other via a fuse and a safety switch at an end portion opposite to the connector box 124.

The upper housing 111 includes a top panel 140 and side panels 141 extending downward from the edges of the top panel 140. An outer periphery of the top panel 140 is matched with an outer periphery of the bottom panel 120 of the lower housing 110. The height of the side panels 141 of the upper housing 111 is smaller than the height of the side panels 121 of the lower housing 110. For example, the height of the side panels 141 is about 25% of the height of the side panels 121. Lower ends of the side panels 141 are provided with a flange 142. The flange 142 is formed with a plurality of through-holes 143. The through-holes 143 are arranged at positions corresponding to the through-holes 128 of the lower housing 110.

Flow passages (not shown) for allowing a cooling medium to pass therethrough are formed inside the top panel 140 of the upper housing 111 and the bottom panel 120 of the lower housing 110.

The power storage modules 60 are sandwiched in an up-and-down direction by passing bolts through the through-holes 128 of the lower housing 110 and the through-holes 143 of the upper housing 111 and fastening the bolts with nuts. As illustrated in FIG. 9B, as the heat transfer plates 21 are sandwiched from above and below by the lower housing 110 and the upper housing 111, the power storage module 60 is firmly and unslidably fixed within the housings. Additionally, the rate of heat transfer between the heat transfer plates 21 and the lower housing 110 and the rate between the heat transfer plates 21 and the upper housing 111 can be increased. The cooling medium that flows through the flow passage formed in the upper housing 111 and the flow passage formed in the lower housing 110 cools the power storage cells 31 (FIG. 9B) via the heat transfer plates 21 (FIG. 9B).

Figure 11:
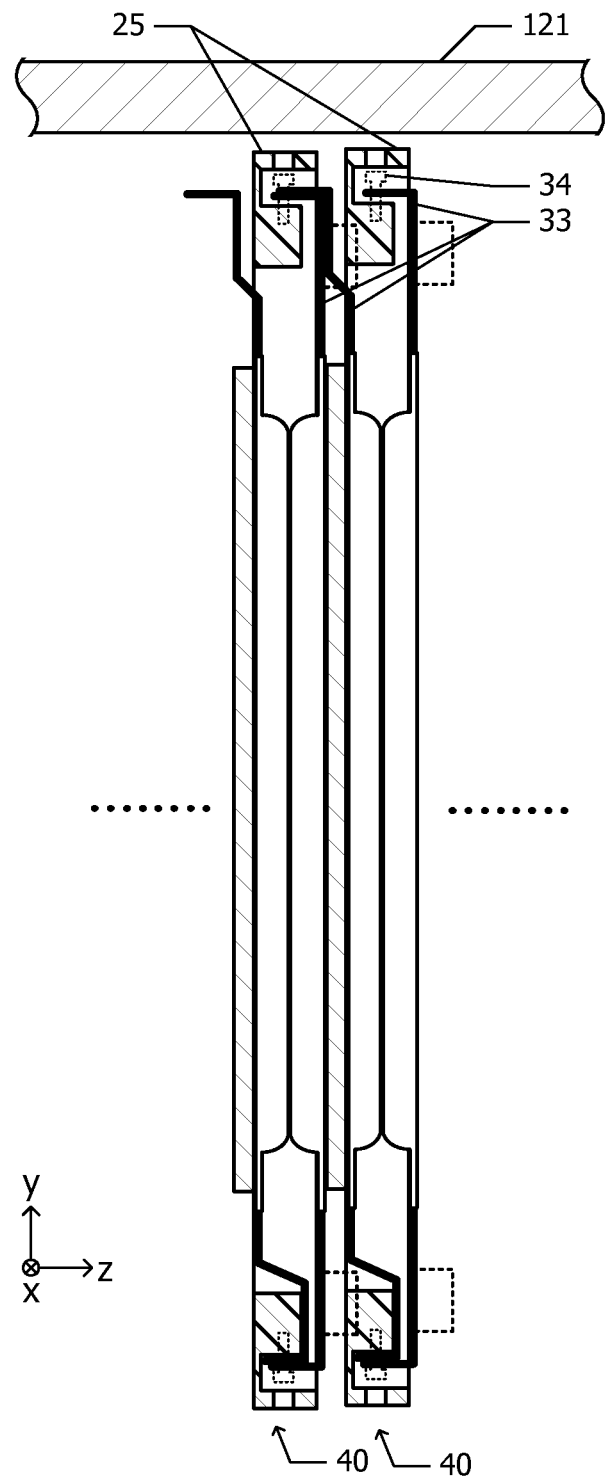
FIG. 11 is a cross-sectional view illustrating the positional relationship between the cell units constituting the power storage module, and a side panel of a housing.

FIG. 11 illustrates the relative positional relationship between the cell units 40 constituting the power storage module 60, and a side panel 121 of the lower housing 110. The protective plates 25 are arranged between the side panel 121 and a component including the screws 34 for fixing the electrode tab 33 and the electrode tab 33. For this reason, electrical short-circuiting, which is caused by an event that the electrode tabs 33 and the screws 34 come into contact with the side panel 121, can be prevented.

Figure 12:
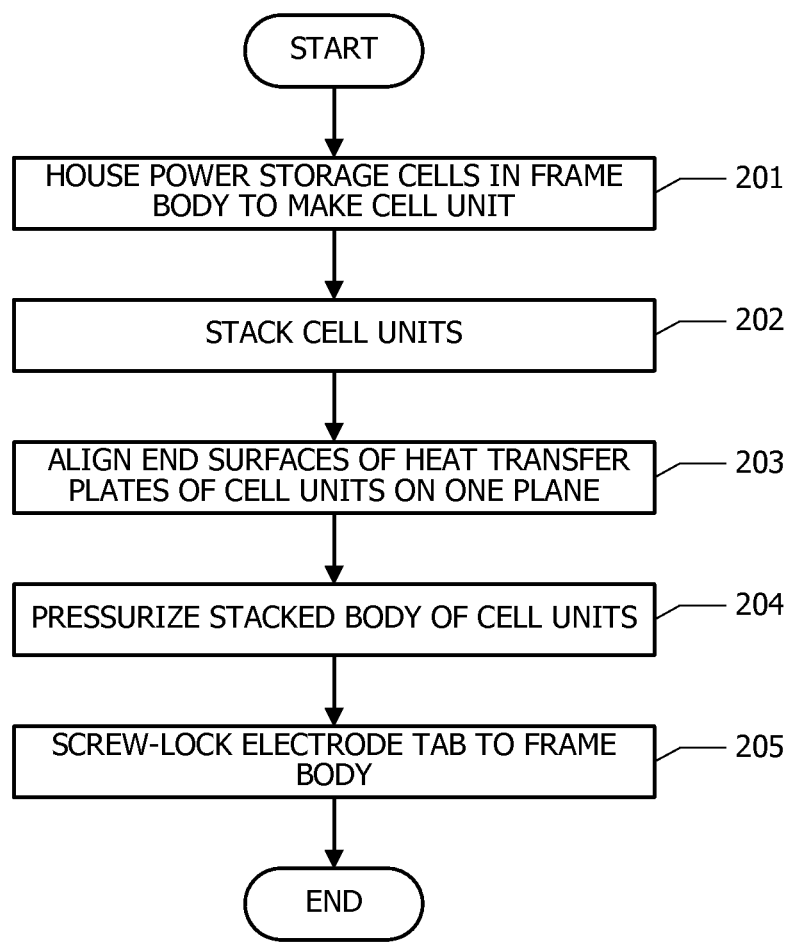
FIG. 12 is a flowchart illustrating a method for manufacturing the power storage module according to the embodiment shown in FIGS. 1A to 1C.

FIG. 12 illustrates a flowchart of a method for manufacturing the power storage module 60 according to the above embodiment shown in FIGS. 1A to 11. In Step 201, the power storage cells 31 (FIGS. 1A to 1C) are housed inside the frame body 20 (FIGS. 2 to 3B). This completes the cell unit 40 (FIGS. 4 to 6). In this case, as illustrated in FIG. 6, the electrode tabs 33 of the two power storage cells 31 on the negative side in the y direction are inserted into the gap between the x-direction portion 20x and the protective plate 25, and are overlapped with each other. The electrode tab 33, on the positive side in the y direction, of the power storage cell 31 on the bottom surface side is led out to the space on the bottom surface side of the frame body 20 through the opening portion 23. The electrode tab 33, on the positive side in the y direction, of the power storage cell 31 on the top surface side is inserted into the gap between the protective plate 25 and the x-direction portion 20x on the positive side in the y direction.

The cell units 40 are stacked in Step 202. Specifically, the protrusions 22 (FIG. 8A and FIG. 8B) of the cell unit 40 are inserted into the recesses 29 (FIGS. 8A and 8B) of the other cell unit 40. In this case, as illustrated in FIG. 7, the electrode tab 33, on the positive side in the y direction, of the power storage cell 31 on the bottom surface side of the cell unit 40 on the positive side in the z direction out of the two cell units 40 adjacent to each other is inserted into the gap between the protective plate 25 and the x-direction portion 20x of the cell unit 40 on the negative side in the z direction, and two electrode tabs 33 are overlapped with each other.

The pressurizing plates 43 (FIGS. 9A and 9B) are arranged at both ends of the stacked structure in a state where the cell units 40 are stacked, and are temporarily fastened with the tie rods 44. In this stage, no compressive force is applied to the stacked structure.

In Step 203, the end surfaces of the heat transfer plates 21 (FIG. 9B) of the stacked structure of the temporarily-fastened cell unit 40 are aligned on one plane. For example, as illustrated in FIG. 9B, the edges of the pressurizing plates 43 bent in an L-shape are directed downward, and are placed on the lower housing 110. In this stage, since no compressive force is applied to the stacked structure, the cell units 40 deviate within a range of the alignment margin of the positioning portions (the protrusions 22 and the recesses 29), in a direction orthogonal to the stacking direction. Alignment margins are secured in the positioning portions to such a degree that the bottom end surfaces of the heat transfer plates 21 are aligned on one plane by compensating variations in the relative position between the heat transfer plates 21 and the frame bodies 20.

In Step 204, the compressive force in the stacking direction is applied to the stacked structure of the cell units 40. Accordingly, the relative positions of the cell units 40 can be fixed in a state where the bottom end surfaces of the heat transfer plates 21 are aligned on one plane.

In Step 205, the overlapped electrode tabs 33 that are inserted between the x-direction portion 20x and the protective plate 25, are fixed to the frame body 20 with the screws 34 (FIG. 7). Accordingly, the power storage cells 31 in the power storage module 60 (FIGS. 9A and 9B) are connected in series. Since the tapped holes 24 (FIG. 7) are formed in the outer peripheral surfaces of the frame bodies 20, the screws 34 can be tightened into the tapped holes in a state where the cell units 40 are stacked.

If a procedure of stacking the cell units 40 after the power storage cells 31 are electrically connected were adopted, when the cell units 40 are stacked, a worker would need to deform the connection points between the electrode tabs 33 and simultaneously perform the alignment of the cell units 40. In the manufacturing method according to the above embodiment, the electrode tabs 33 are not connected between the cell units 40 in the process of stacking the cell units 40. For this reason, when the cell units 40 are stacked, the worker is spared the complicated operation of deforming the connection points of the electrode tabs 33 and simultaneously performing the alignment of the cell units 40.

Additionally, in the method according to the above embodiment, the electrode tab 33 is screwed to the frame body after compressive forces are applied with the pressurizing plates 43 and the tie rods 44 (FIG. 9A). When the compressive force is applied to the stacked structure of the cell units 40, the plurality of cell units 40 are relatively displaced in the stacking direction (z direction) as the power storage cells 31 are deformed. Since the electrode tabs 33 are not fixed to the frame bodies 20 at this moment, even if the cell units 40 are displaced in the stacking direction, deformation of the electrode tabs 33 does not occur. For this reason, stresses caused in the connection point between the electrode tab 33 and the positive electrode current collector 51 and the connection points between the electrode tab 33 and the negative electrode current collectors 52, which are illustrated in FIG. 1B, can be reduced.

Figure 13:
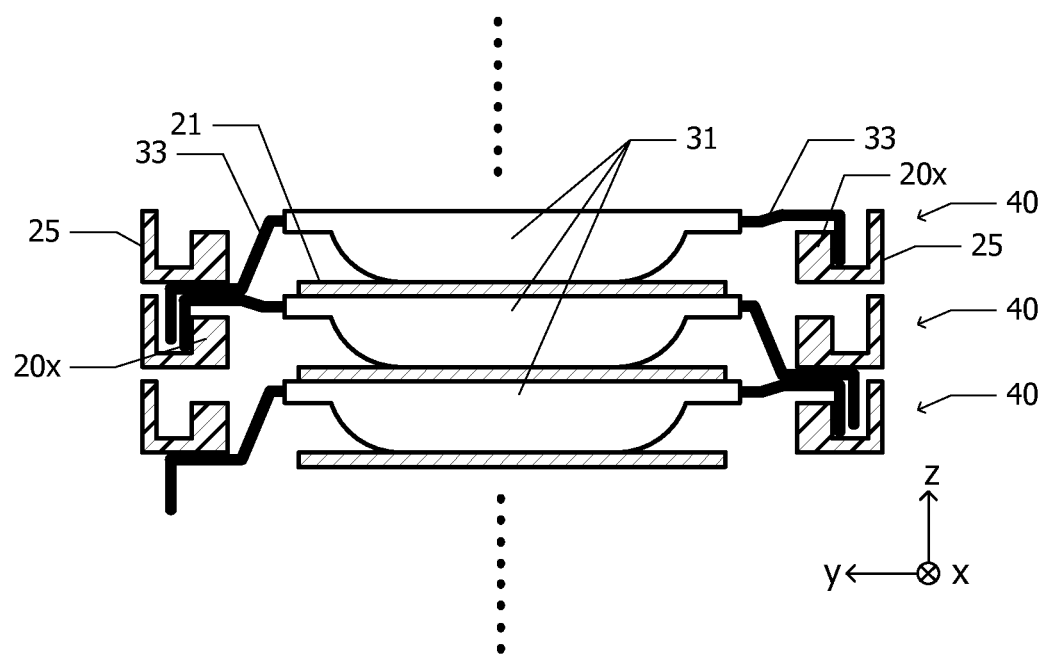
FIG. 13 is a cross-sectional view of a portion of a power storage module according to another embodiment.

FIG. 13 illustrates a cross-sectional view of a portion of a power storage module according to another embodiment. Hereinafter, differences between the power storage module according to the embodiment illustrated in FIG. 7 and the power storage module in this embodiment shown in FIG. 13 will be described, and description of identical configurations will be omitted.

In the above embodiment, as illustrated in FIGS. 6 and 7, the two power storage cells 31 are housed in one cell unit 40. In the embodiment shown in FIG. 13, one power storage cell 31 is housed in one cell unit 40.

For example, in the odd-numbered cell units 40 (the cell units 40 at a lower end and an upper end among the three cell units 40 illustrated in FIG. 13) of the cell units 40 lined up in the stacking direction, the electrode tab 33 on the negative side in the y direction is inserted into the gap between the protective plate 25 and the x-direction portion 20x of the frame body 20 in which the power storage cell 31 is housed. The electrode tab 33 on the positive side in the y direction passes through the opening portion 23, and is inserted into the gap between the protective plate 25 and the x-direction portion 20x on the positive side in the y direction of the cell unit 40 adjacent to the odd-numbered cell unit 40 on the negative side in the z direction.

In the even-numbered cell unit 40 (the central cell unit 40 among the three cell units 40 illustrated in FIG. 13), the electrode tab 33 on the positive side in the y direction is inserted into the gap between the protective plate 25 and the x-direction portion 20x of the frame body 20 in which the power storage cell 31 is housed. The electrode tab 33 on the negative side in the y direction passes through the opening portion 23, and is inserted into the gap between the protective plate 25 and the x-direction portion 20x on the negative side in the y direction of the cell unit 40 adjacent to the even-numbered cell unit 40 on the negative side in the z direction. That is, the configurations of the electrode tabs 33 are reversed in the y direction between the odd-numbered cell units 40 and the even-numbered cell unit 40.

In the embodiment shown in FIG. 13, the electrode tabs 33 can also be screw-locked after the cell units 40 are stacked, similarly to the embodiment shown in FIGS. 1A to 12. In the embodiment shown in FIG. 13, one screw-locking portion out of the two screw-locking portions provided in the frame body 20 is not used. In addition, three or more power storage cells 31 may be housed in one cell unit 40.

A power storage module according to further another embodiment will be described with reference to FIGS. 14 to 16. Hereinafter, description will be made paying attention to differences from the embodiment shown in FIGS. 1A to 12, and description of identical configurations will be omitted.

Figure 14:
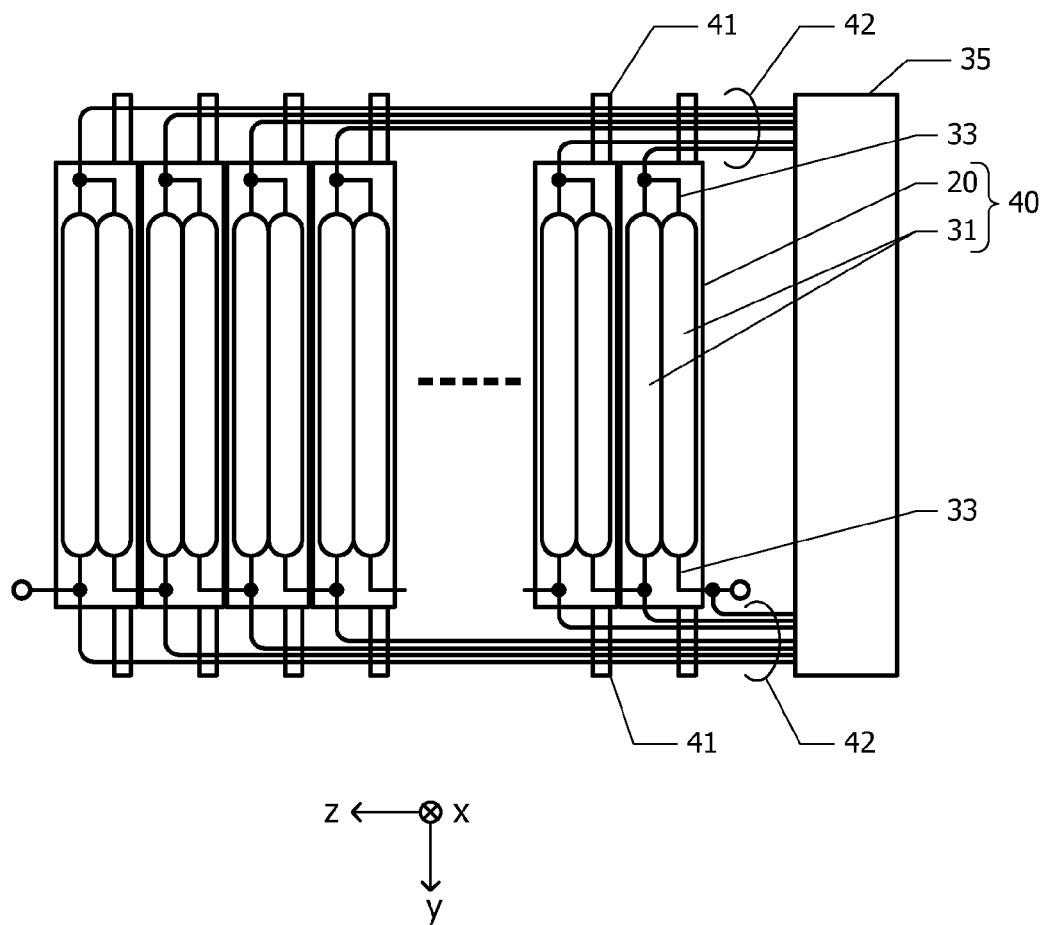
FIG. 14 is a schematic view of a power storage module according to further another embodiment.

FIG. 14 illustrates a schematic view of the power storage module according to the this embodiment. The plurality of cell units 40 are stacked. An xyz rectangular coordinate system having the stacking direction of the cell units 40 as the z direction is defined. Each of the cell units 40 includes a frame body 20 and two power storage cells 31. Each of the power storage cells 31 has a substantially oblong plate-shaped outer shape, and the two power storage cells 31 are stacked in the z direction within the cell unit 40. The frame body 20 supports the two power storage cells 31. Each of the power storage cells 31 has a pair of electrode tabs 33. The pair of electrode tabs 33 are respectively led out from mutually opposite edges (an edge on the positive side of the y axis and an edge on the negative side of the y axis in FIG. 14) of the plate-shaped portion of the power storage cell 31.

The two power storage cells 31 within the same cell unit 40 are connected to each other via the electrode tabs 33 led out from the edges on the negative side of the y axis. The electrode tabs 33 led out from the edges on the positive side of the y axis are connected to the electrode tabs 33 led out from the edges, on the positive side of the y axis, of the power storage cells 31 within the next cell unit 40. Accordingly, the plurality of stacked power storage cells 31 are connected in series.

The voltage-monitoring wiring lines 42 are connected to the electrode tabs 33 of the power storage cells 31. One voltage-monitoring wiring line 42 is prepared for two electrode tabs 33 that are connected to each other. With respect to the electrode tabs 33 of both ends of a series circuit including the plurality of power storage cells 31, one voltage-monitoring wiring line 42 is connected to one electrode tab 33. The voltage-monitoring wiring lines 42 connect the electrode tabs 33 of the power storage cells 31 to a voltage monitoring part 35.

Position constraint structures 41 constrain the positions of the voltage-monitoring wiring lines 42 with respect to the frame bodies 20. Here, the "constraint" does not mean fixing the voltage-monitoring wiring lines 42 with respect to the frame body 20 but means limiting free scattering of the voltage-monitoring wiring lines 42. The voltage-monitoring wiring lines 42 can be moved within a limited range. Scattering of the voltage-monitoring wiring lines 42 is prevented by constraining the positions of the voltage-monitoring wiring lines 42. This can enhance the workability during power storage module assembly.

Figure 15:
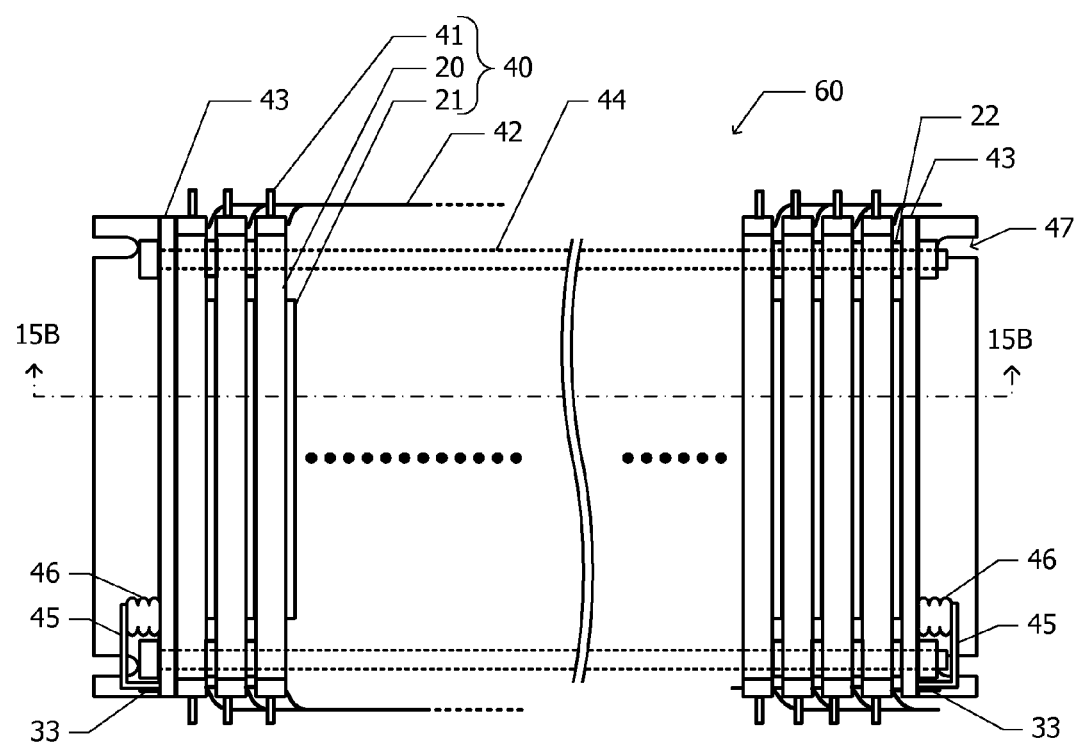
FIG. 15 is a plan view of the power storage module according to the embodiment shown in FIG. 14.

FIG. 15 illustrates a plan view of the power storage module 60 according to the embodiment shown in FIG. 14. The plurality of cell units 40 are stacked. A compressive force in the stacking direction is applied to the stacked structure of the cell units 40 by the pressurizing mechanism. The pressurizing mechanism includes the pressurizing plates 43 arranged at both ends of the stacked structure, and the plurality of, for example, four tie rods 44.

Two voltage-monitoring wiring lines 42 are led out from each of the cell units 40. The position constraint structures 41 constrain the positions of the voltage-monitoring wiring lines 42.

Figure 16:
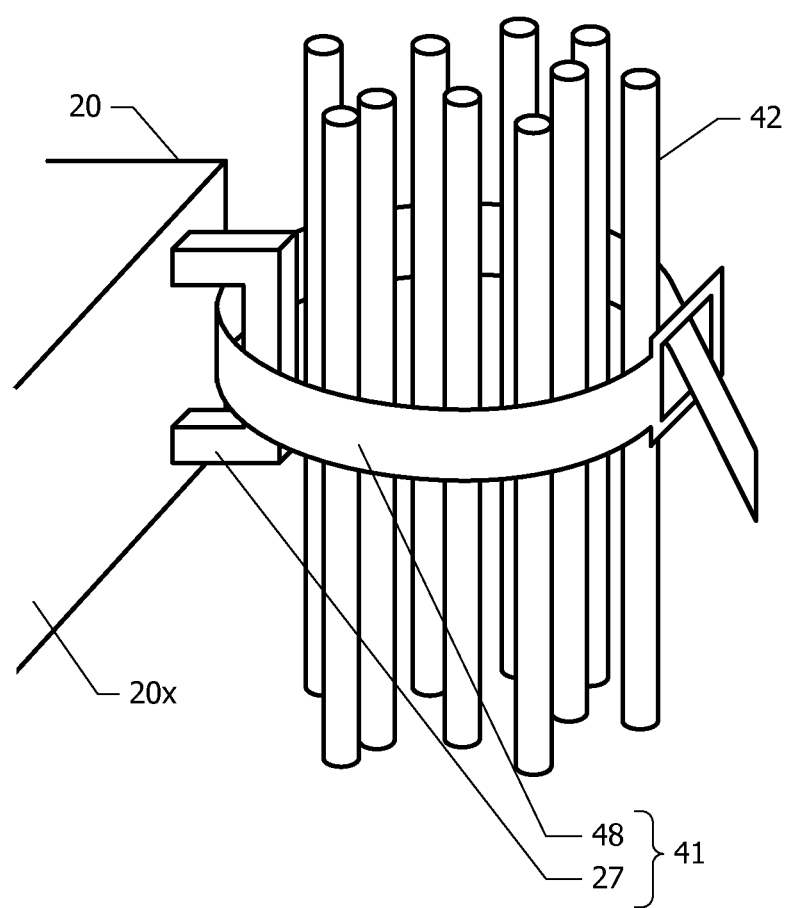
FIG. 16 is a perspective view of a position constraint structure of the power storage module according to the embodiment shown in FIG. 14.

FIG. 16 illustrates a perspective view of a position constraint structure 41. The position constraint structure 41 includes the portion 27 to be bound and a binding member (binding band) 48. The portion 27 to be bound has a portal frame shape, and is fixed to the outside surface of the x-direction portion 20x of the frame body 20. The binding member 48 binds the plurality of voltage-monitoring wiring lines 42 together with the portion 27 to be bound. Free movement of the voltage-monitoring wiring lines 42 are prevented, and the positions of the voltage-monitoring wiring lines 42 are constrained with respect to the frame body 20. This can prevent a number of the voltage-monitoring wiring lines 42 from being scattered. Moreover, it is possible to easily perform the work of loading the power storage module 60 into the lower housing 110 (FIG. 10B).

Although the portion 27 to be bound is formed in a portal frame shape in the embodiment shown in FIGS. 14 to 16, other shapes capable of being bound by the binding member 48 may be adopted. For example, an L shape may be adopted. In addition, a structure in which the frame body 20 is formed with a recess and a beam is built across the opening portion of the recess may be adopted. This beam can be used as the portion 27 to be bound.

A power storage module according to still further another embodiment will be described with reference to FIGS. 17 and 18. Hereinafter, differences from the embodiment shown in FIGS. 14 to 16 will be described, and description of identical configurations will be omitted.

Figure 17:
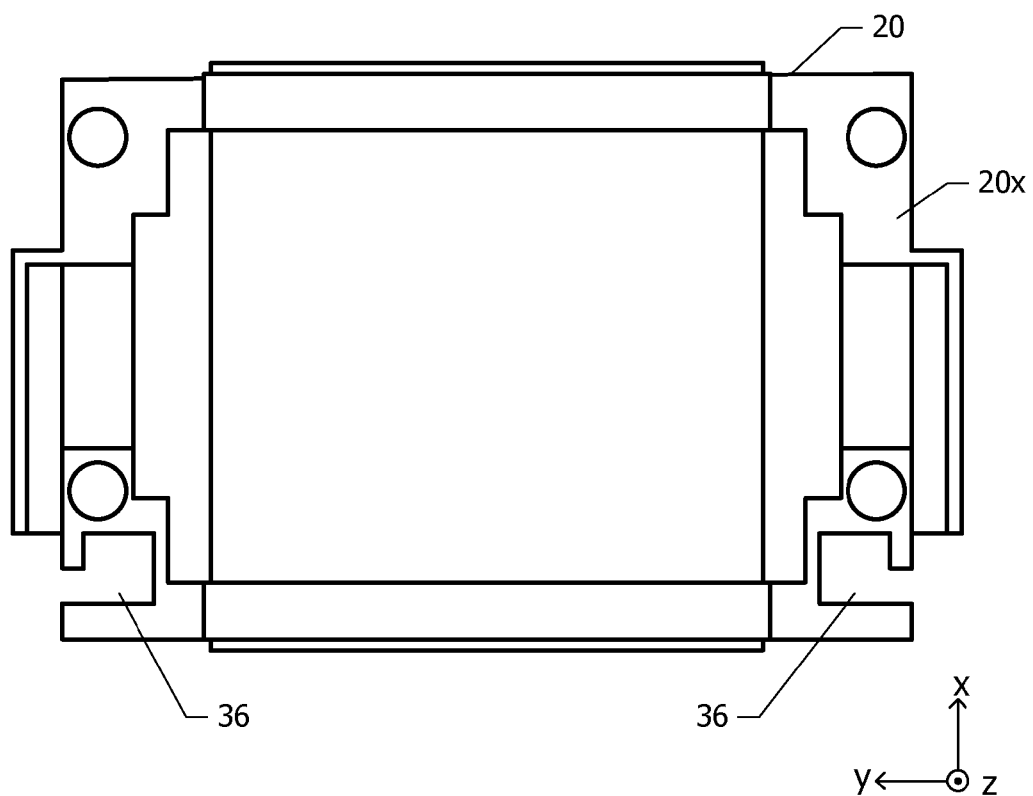
FIG. 17 is a plan view of a frame body used for a power storage module according to further another embodiment.

FIG. 17 illustrates a plan view of the frame body 20 used for the power storage module according to this embodiment. The frame body 20 used for the power storage module according to this embodiment is not provided with the portion 27 to be bound (FIGS. 2, 3A, and 3B) in the embodiment shown in FIGS. 14 to 16. Instead, the frame body 20 is formed with two cutout portions 36. Each cutout portion 36 passes through the frame body 20 in the stacking direction (z direction) of the cell units 40. Moreover, the cutout portions 36 are open to the outside surface of the x-direction portion 20x. The dimension, in the x direction, of the opening portion on the outside surface of the x-direction portion 20x is smaller than the dimension, in the x direction, of the cutout portion 36 in a region recessed from the outside surface of the x-direction portion 20x.

Figure 18:
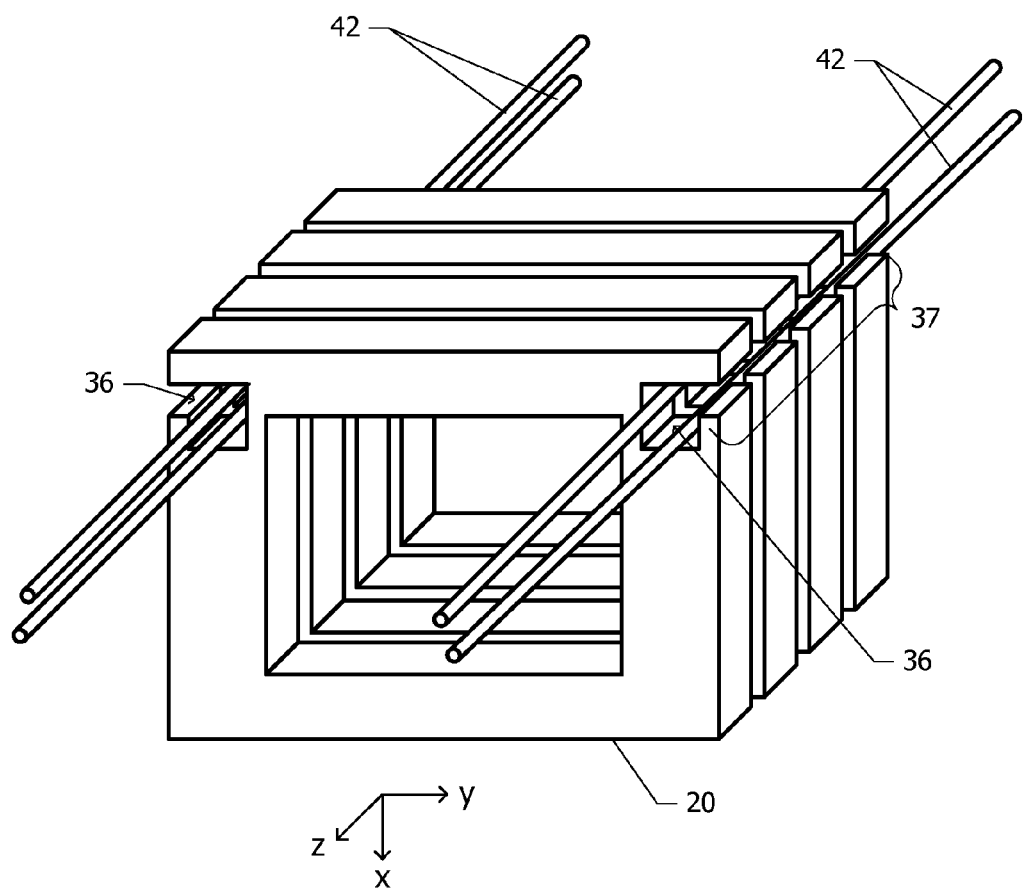
FIG. 18 is a schematic perspective view in a state where frame bodies of the power storage module according to the embodiment shown in FIG. 17 are stacked.

FIG. 18 illustrates a schematic perspective view in a state where the frame bodies 20 are stacked. In FIG. 18, the description of the power storage cells 31, the heat transfer plates 21, and the like is omitted. As the cutout portions 36 are lined up in the stacking direction (the z direction), a tunnel-shaped passage 37 extending in the z direction is configured. The passage 37 allows the voltage-monitoring wiring lines 42 to pass therethrough. In this embodiment, the cutout portions 36 serve as the position constraint structures that constrain the positions of the voltage-monitoring wiring lines 42. In this embodiment, scattering of the voltage-monitoring wiring lines 42 can be prevented similarly to the embodiment shown in FIGS. 14 to 16.

Figure 19:
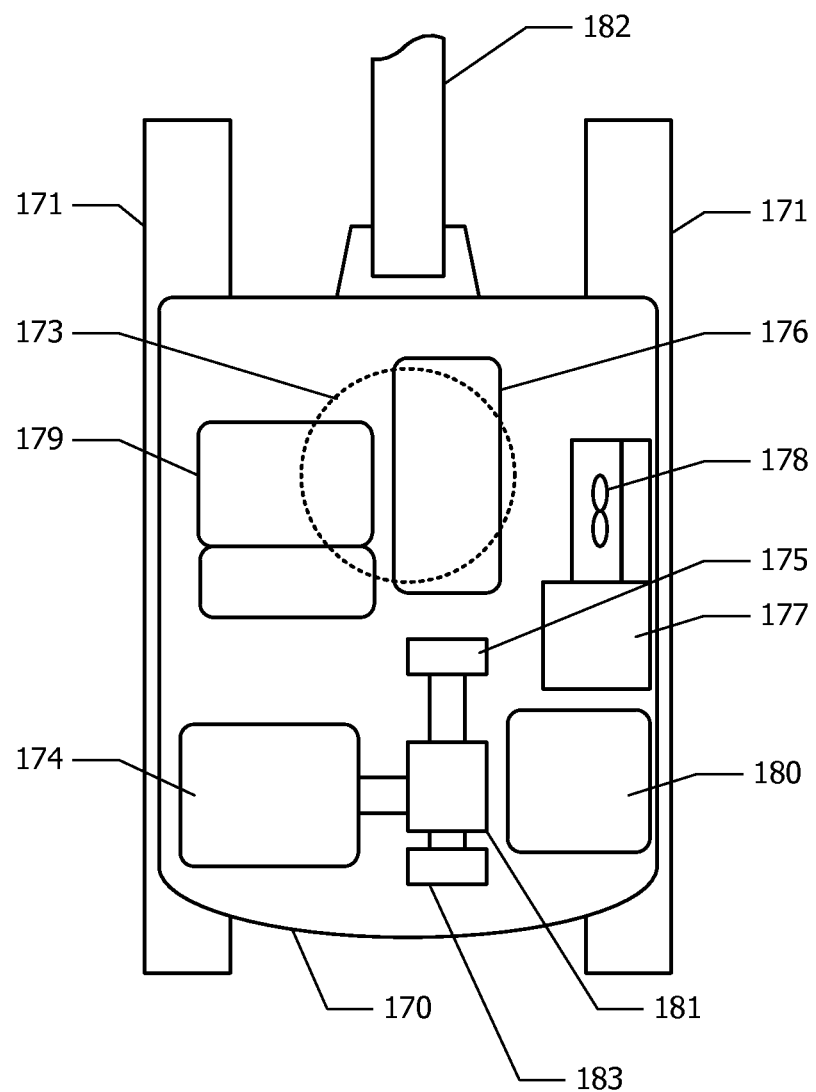
FIG. 19 is a schematic plan view of a shovel according to further another embodiment.

FIG. 19 illustrates a schematic plan view of a shovel as an example of a hybrid working machine according to further another embodiment. A lower traveling body 171 is attached to an upper swivel body 170 via a swiveling bearing 173. The upper swivel body 170 is mounted with an engine 174, a main hydraulic pump 175, a swiveling motor (electrically driven part) 176, an oil tank 177, a cooling fan 178, a seat 179, a power storage device 180, and a motor generator (electrically driven part) 183. The engine 174 generates motive power through combustion of fuel. The engine 174, the main hydraulic pump 175, and the motor generator 183 mutually send and receive a torque via a torque transmission mechanism 181. The main hydraulic pump 175 supplies pressurized oil to a hydraulic cylinder for a boom 182 or the like. The power storage device 180 includes the power storage module 60 (FIGS. 9A and 9B) according to any one of the above embodiments shown in FIGS. 1A to 18, the lower housings 110 (FIG. 10B), and the upper housing 111 (FIG. 10A).

The motor generator 183 is driven by the motive power of the engine 174 to generate electricity (power-generating operation). The generated electric power is supplied to the power storage device 180, and the power storage device 180 is charged. Additionally, the motor generator 183 is driven by the electric power from the power storage device 180, and generates the motive power for assisting the engine 174 (assisting operation). The oil tank 177 stores oil for a hydraulic circuit. The cooling fan 178 suppresses a rise in the oil temperature of the hydraulic circuit. An operator sits down on the seat 179 to manipulate the shovel.

The swiveling motor 176 is driven by the electric power supplied from the power storage device 180. The swiveling motor 176 swivels the upper swivel body 170. Additionally, the swiveling motor 176 generates regenerative electric power by converting kinetic energy into electrical energy. The power storage device 180 is charged by the generated regenerative electric power.

Figure 20:
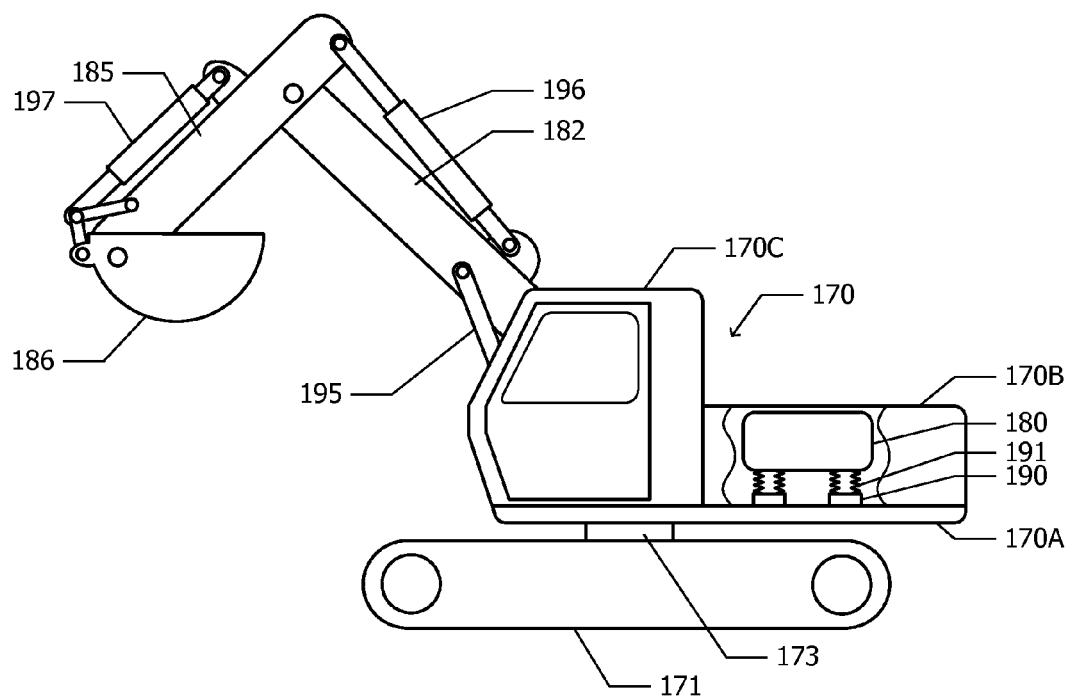
FIG. 20 is a partially broken side view of the shovel according to the embodiment shown in FIG. 19.

FIG. 20 illustrates a partially broken side view of the shovel according to the embodiment shown in FIG. 19. The upper swivel body 170 is mounted on the lower traveling body 171 via the swiveling bearing 173. The upper swivel body 170 includes a swiveling frame 170A, a cover 170B, and a cabin 170C. The swiveling frame 170A functions as a supporting structure of the cabin 170C and various parts. The cover 170B covers various parts mounted on the swiveling frame 170A, for example, the power storage device 180. The seat 179 (FIG. 19) is housed within the cabin 170C.

The swiveling motor 176 (FIG. 19) swivels the swiveling frame 170A, which is an object to be driven, in a clockwise direction or in a counterclockwise direction with respect to the lower traveling body 171. The boom 182 is attached to the upper swivel body 170. The boom 182 is swung in an up-and-down direction with respect to the upper swivel body 170 by the boom cylinder 195 that is hydraulically driven. An arm 185 is attached to the tip of the boom 182. The posture of the arm 185 is changed by the arm cylinder 196 that is hydraulically driven. A bucket 186 is attached to the tip of the arm 185. The posture of the bucket 186 is changed by the bucket cylinder 197 that is hydraulically driven.

The power storage device 180 is mounted on the swiveling frame 170A via a mount 190 for a power storage device, and a damper (vibration-proofing device) 191. The power storage device 180 is arranged, for example, behind the cabin 170C. The cover 170B covers the power storage device 180.

The swiveling frame 170A vibrates greatly during traveling and working compared to general transportation vehicles. For this reason, the power storage device 180 mounted on the swiveling frame 170A is apt to receive a large shock. Since the power storage modules 60 according to the above embodiments shown in FIGS. 1A to 18 are firmly fixed within the lower housing 110 and the upper housing 111, the shock resistance of the power storage device 180 can be enhanced.

Figure 21:
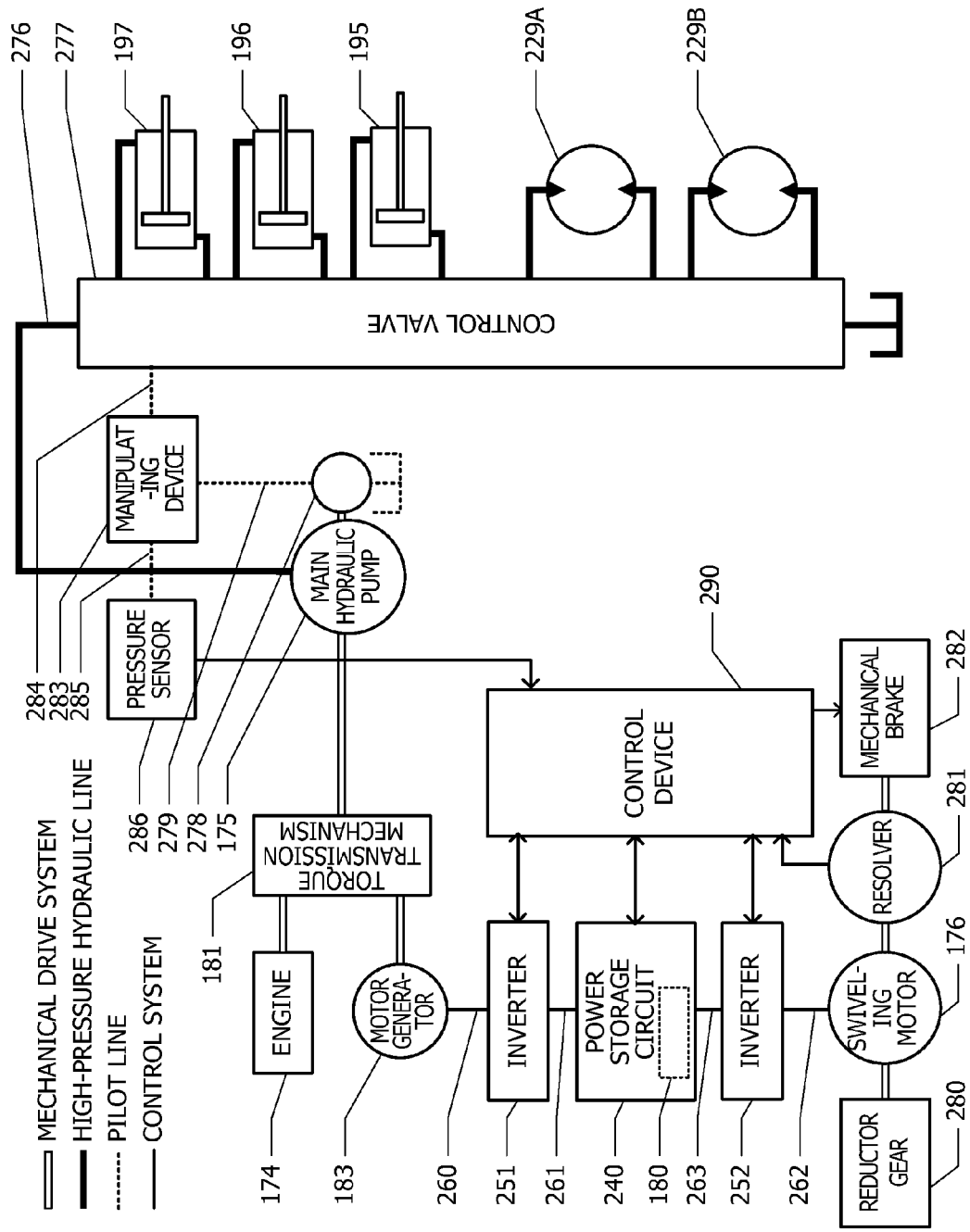
FIG. 21 is a block diagram of the shovel according to the embodiment shown in FIG. 19.

FIG. 21 illustrates a block diagram of the shovel according to the embodiment shown in FIGS. 19 and 20. In FIG. 21, a mechanical power system is shown by double lines, high-pressure hydraulic lines are shown by thick solid lines, an electrical control system is shown by thin solid lines, and pilot lines are shown by dashed lines.

A drive shaft of the engine 174 is coupled to an input shaft of the torque transmission mechanism 181. Internal combustion engines, such as an engine that generates a driving force from energy other than electricity, for example, a diesel engine, are used for the engine 174. The engine 174 is always driven during the operation of a working machine.

A drive shaft of the motor generator 183 is coupled to another input shaft of the torque transmission mechanism 181. The motor generator 183 can perform both of the electrically-powered (assisting) operation and the power-generating operation. An internal permanent magnet (IPM) motor in which magnets are embedded inside a rotor, for example, is used for the motor generator 183.

The torque transmission mechanism 181 has two input shafts and one output shaft. A drive shaft of the main hydraulic pump 175 is connected to the output shaft.

When a load applied to the main hydraulic pump 175 is large, the motor generator 183 performs the assisting operation, and the driving force of the motor generator 183 is transmitted to the main hydraulic pump 175 via the torque transmission mechanism 181. This reduces the load applied to the engine 174. On the other hand, when the load applied to the main hydraulic pump 175 is small, the power-generating operation of the motor generator 183 is performed by transmitting the driving force of the engine 174 to the motor generator 183 via the torque transmission mechanism 181.

The main hydraulic pump 175 supplies hydraulic pressure to a control valve 277 via a high-pressure hydraulic line 276. The control valve 277 distributes the hydraulic pressure to hydraulic motors 229A and 229B, the boom cylinder 195, the arm cylinder 196, and the bucket cylinder 197 by a command from a driver. The hydraulic motors 229A and 229B respectively drive two left and right crawlers provided at the lower traveling body 171 illustrated in FIGS. 19 and 20.

The motor generator 183 is connected to a power storage circuit 240 via an inverter 251. The swiveling motor 176 is connected to the power storage circuit 240 via an inverter 252. The inverters 251 and 252 and the power storage circuit 240 are controlled by the control device 290.

The inverter 251 performs an operation control of the motor generator 183 on the basis of a command from the control device 290. Switching between the assisting operation and the power-generating operation of the motor generator 183 is performed by the inverter 251.

Required electric power is supplied from the power storage circuit 240 through the inverter 251 to the motor generator 183 during a period in which the assisting operation of the motor generator 183 is performed. The electric power generated by the motor generator 183 is supplied to the power storage circuit 240 through the inverter 251 during a period in which the power-generating operation of the motor generator 183 is performed. Accordingly, the power storage device 180 within the power storage circuit 240 is charged. The power storage modules according to the embodiments shown in FIGS. 1A to 18 are used for the power storage module within the power storage device 180.

The swiveling motor 176 is AC-driven by the inverter 252 to be able to operate both a powering operation and a regenerative operation. For example, the IPM motor is used for the swiveling motor 176. During the powering operation of the swiveling motor 176, electric power is supplied from the power storage circuit 240 via the inverter 252 to the swiveling motor 176. The swiveling motor 176 swivels the upper swivel body 170 (FIGS. 19 and 20) via a reduction gear 280. During the regenerative operation, the swiveling motor 176 generates regenerative electric power as the rotational motion of the upper swivel body 170 is transmitted to the swiveling motor 176 via the reduction gear 280. The generated regenerative electric power is supplied to the power storage circuit 240 via the inverter 252. Accordingly, the power storage device 180 within the power storage circuit 240 is charged.

A resolver 281 detects the position of a rotary shaft of the swiveling motor 176 in a rotational direction. The detection result of the resolver 281 is input to the control device 290. By detecting the position of the rotary shaft in the rotational direction before and after the operation of the swiveling motor 176, the swiveling angle and the swiveling direction of the swiveling motor 176 are derived.

A mechanical brake 282 is coupled to the rotary shaft of the swiveling motor 176, and generates a mechanical braking force. The mechanical break 282 is controlled by the control device 290, and the braking state and release state of the mechanical brake 282 are switched by an electromagnetic switch.

The pilot pump 278 generates a pilot pressure required for a hydraulic manipulation system. The generated pilot pressure is supplied to a manipulating device 283 via a pilot line 279. The manipulating device 283 includes a lever or a pedal, and is manipulated by a driver. The manipulating device 283 converts a primary-side hydraulic pressure supplied from the pilot line 279 into a secondary-side hydraulic pressure according to the driver's manipulation. The secondary-side hydraulic pressure is transmitted to the control valve 277 via a hydraulic line 284, and is transmitted to a pressure sensor 286 via another hydraulic line 285.

A detection result of pressure detected by the pressure sensor 286 is input to the control device 290. This enables the control device 290 to detect a manipulation status of the lower traveling body 171, the swiveling motor 176, the boom 182, the arm 185, and the bucket 186 (FIG. 14).

The upper swivel body 170 (FIGS. 19 and 20) of the working machine is apt to vibrate during working and traveling compared to general transportation vehicles. For this reason, the power storage device 180 mounted on the upper swivel body 170 also vibrates, and receives a shock. In the embodiment shown in FIGS. 19 to 21, the voltage-monitoring wiring lines 42 (FIGS. 7 and 15) of the power storage module 60 (FIGS. 9A, 9B, and 15) included in the power storage device 180 is constrained with respect to the frame bodies 20. For this reason, even if the power storage module 60 vibrates and receives a shock, the voltage-monitoring wiring lines 42 are not easily damaged, and occurrence of disconnection can be prevented.

Although the present invention has been described above on the basis of the embodiments, the present invention is not limited to these embodiments. For example, it will be obvious to those skilled in the art that various changes, improvements, combinations, or the like are possible.

Inventions described in the following Appendixes are disclosed on the basis of the above embodiments.

APPENDIX 1

A power storage module, which includes a plurality of stacked cell units, in which each of the cell units has a power storage cell including a pair of electrode tabs; and a frame body configured to support the power storage cell, in which each of the frame bodies has a screw-locking portion formed on a surface facing laterally and outwardly from the stacked structure, and in which the plurality of power storage cells are electrically connected by screw-locking the electrode tabs of the power storage cells to the screw-locking portions.

APPENDIX 2

Moreover, the power storage module according to Appendix 1, in which the power storage module further includes an insulating protective plate provided corresponding to the frame body and configured to cover the electrode tab screw-locked to the screw-locking portion; and a supporting wall configured to support the protective plate on the frame body.

APPENDIX 3

The power storage module according to Appendix 2, in which the supporting wall and the protective plate are integrally molded with the frame body.

APPENDIX 4

The power storage module according to Appendix 2 or 3, in which the frame body includes a top surface facing a first direction parallel to the stacking direction and a bottom surface facing a second direction opposite to the first direction, and the supporting wall is configured so as to prevent the electrode tab extending from the inside of the frame body to the screw-locking portion passing above the top surface from protruding from the bottom surface in the second direction.

APPENDIX 5

A power storage module, which includes a plurality of stacked cell units and a voltage-monitoring wiring lines led out from each of the cell units, in which each of the cell units includes a power storage cell having a pair of electrode terminals, a frame body configured to support the power storage cell, and a position constraint structure configured to constrain the position of the voltage-monitoring wiring lines with respect to the frame body, and in which the plurality of power storage cells are connected in series as a whole, and the voltage-monitoring wiring lines are connected to the electrode terminals of the power storage cells.

APPENDIX 6

The power storage module according to Appendix 5, in which the position constraint structure includes a binding member configured to bind the voltage-monitoring wiring lines, and a portion to be bound that is fixed to the frame body and bound together with the voltage-monitoring wiring lines by the binding member.

APPENDIX 7

The power storage module according to Appendix 6, in which each of the frame bodies is formed with a cutout portion passing through the frame body in the stacking direction of the cell units, the cutout portions of the plurality of frame bodies constitute a passage extending in the stacking direction, in a state where the plurality of cell units are stacked, and the passage serves as the position constraint structure as the voltage-monitoring wiring lines are allowed to pass through the passage.

What is claimed is:
1. A shovel comprising:
a power storage module; and
an electric motor driven by electric power stored in the power storage module,
wherein the power storage module includes a plurality of cell units stacked to form a stacked structure,
wherein each of the cell units includes
a power storage cell including a pair of electrode tabs; and
a frame body configured to support the power storage cell,
wherein the frame body surrounds the power storage cell when viewed with a line of sight parallel to a stacking direction of the stacked structure, wherein each of the frame bodies includes a screw-locking portion formed on a surface facing laterally and outwardly from the stacked structure, a top surface facing a first direction parallel to the stacking direction and a bottom surface facing a second direction opposite to the first direction, wherein the plurality of power storage cells are electrically connected by screw-locking the electrode tabs of the power storage cells to the screw-locking portions, the electrode tab extending from the inside of the frame body to the screw-locking portion passing above the top surface, and wherein a margin in directions in which the frame bodies approach each other in the stacking direction remains between the top surface and the bottom surface facing each other of the frame bodies adjacent to each other.

2. The shovel according to claim 1,
wherein the power storage module further includes:
an insulating protective plate provided corresponding to the frame body and configured to cover the electrode tab screw-locked to the screw-locking portion; and
a supporting wall configured to support the protective plate above the frame body.

3. The shovel according to claim 2,
wherein the supporting wall and the protective plate are integrally molded with the frame body.

4. The shovel according to claim 1,
wherein the power storage module further includes:
a voltage-monitoring wiring lines led out from each of the cell units,
wherein each of the cell unit further includes:
a position constraint structure configured to constrain the position of the voltage-monitoring wiring lines with respect to the frame body, and
wherein the plurality of power storage cells are connected in series as a whole, and the voltage-monitoring wiring lines are connected to the electrode tabs of the power storage cells.

5. The shovel according to claim 1, further comprising a pressurizing mechanism configured to apply a compressive force in the stacking direction to the cell units.

6. The shovel according to claim 1, wherein a first region of the top surface of the frame body overlapping the electrode tab is lower than regions on both sides of the first region.

7. The shovel according to claim 1,
wherein each of the cell units includes a heat transfer plate attached to the bottom surface of the frame body,
wherein the frame body includes x-direction portions along sides parallel to each other of an oblong shape, and y-direction portions along the other two sides of the oblong shape,
wherein the heat transfer plate is laid between the y-direction portions and stays away from the x-direction portions, and
wherein a region of the top surface of the y-direction portions that overlap the heat transfer plate are lower than other regions of the y-direction portions.

8. The shovel according to claim 7,
wherein one electrode tab of the power storage cell passes through an opening portion between the heat transfer plate and the x-direction portion, and is led out to a space on the bottom surface side of the frame body.

9. The shovel according to claim 7,
wherein two of the power storage cells are stacked and supported in one frame body,
wherein one electrode tab of the power storage cell on a top side and one electrode tab of the power storage cell on a bottom side are screw-locked to a same screw-locking portion of one frame body, and wherein the other electrode tab of the frame body on the bottom side passes through an opening portion between the heat transfer plate and the x-direction portion and is led out to a space on the bottom surface side of the frame body and connected to the power storage cell of another cell unit on the bottom side.

10. A shovel comprising:
a power storage module; and
an electric motor driven by electric power stored in the power storage module,
wherein the power storage module includes a plurality of cell units stacked to form a stacked structure,
wherein each of the cell units includes
a power storage cell including a pair of electrode tabs; and
a frame body configured to support the power storage cell,
wherein each of the frame bodies includes a screw-locking portion formed on a surface facing laterally and outwardly from the stacked structure,
wherein the plurality of power storage cells are electrically connected by screw-locking the electrode tabs of the power storage cells to the screw-locking portions,
wherein the power storage module further includes:
an insulating protective plate provided corresponding to the frame body and configured to cover the electrode tab screw-locked to the screw-locking portion; and
a supporting wall configured to support the protective plate above the frame body,
wherein the frame body includes a top surface facing a first direction parallel to a stacking direction of the stacked structure and a bottom surface facing a second direction opposite to the first direction, and
wherein the supporting wall is configured so as to prevent the electrode tab extending from the inside of the frame body to the screw-locking portion passing above the top surface from protruding from the bottom surface in the second direction.

11. The shovel according to claim 10,
wherein a first region of the top surface of the frame body overlapping the electrode tab is lower than regions on both sides of the first region.

12. The shovel according to claim 10,
wherein second regions of an inside surface of the frame body intersecting the electrode tab are located at an outer position than regions on both sides of the second regions.

13. The shovel according to claim 10,
wherein any one of the top surface and the bottom surface of the frame body is formed with a protrusion, the other surface is formed with a recess, and the positions of the plurality of frame bodies in a direction orthogonal to the stacking direction of the cell units are constrained by inserting the protrusion of one of the frame body into the recess of another one of the frame body.

14. A shovel comprising:
a power storage module; and
an electric motor driven by electric power stored in the power storage module,
wherein the power storage module includes a plurality of cell units stacked to form a stacked structure,
wherein each of the cell units includes
a power storage cell including a pair of electrode tabs; and
a frame body configured to support the power storage cell,
wherein each of the frame bodies includes a screw-locking portion formed on a surface facing laterally and outwardly from the stacked structure, wherein the plurality of power storage cells are electrically connected by screw-locking the electrode tabs of the power storage cells to the screw-locking portions,
wherein the power storage module further includes:
a voltage-monitoring wiring lines led out from each of the cell units,
wherein each of the cell unit further includes:
a position constraint structure configured to constrain the position of the voltage-monitoring wiring lines with respect to the frame body,
wherein the plurality of power storage cells are connected in series as a whole, and the voltage-monitoring wiring lines are connected to the electrode tabs of the power storage cells,
wherein the position constraint structure includes:
a binding member configured to bind the voltage-monitoring wiring lines; and
a portion to be bound that is fixed to the frame body and bound together with the voltage-monitoring wiring lines by the binding member.

15. A shovel comprising:
a power storage module; and
an electric motor driven by electric power stored in the power storage module,
wherein the power storage module includes a plurality of cell units stacked to form a stacked structure,
wherein each of the cell units includes
a power storage cell including a pair of electrode tabs; and
a frame body configured to support the power storage cell,
wherein each of the frame bodies includes a screw-locking portion formed on a surface facing laterally and outwardly from the stacked structure,
wherein the plurality of power storage cells are electrically connected by screw-locking the electrode tabs of the power storage cells to the screw-locking portions,
wherein the power storage module further includes:
a voltage-monitoring wiring lines led out from each of the cell units,
wherein each of the cell unit further includes:
a position constraint structure configured to constrain the position of the voltage-monitoring wiring lines with respect to the frame body,
wherein the plurality of power storage cells are connected in series as a whole, and the voltage-monitoring wiring lines are connected to the electrode tabs of the power storage cells, and
wherein each of the frame bodies is formed with a cutout portion passing through the frame body in the stacking direction of the cell units, the cutout portions of the plurality of frame bodies constitute a passage extending in the stacking direction, in a state where the plurality of cell units are stacked, and the passage serves as the position constraint structure as the voltage-monitoring wiring lines are allowed to pass through the passage.

* * * * *